(12) United States Patent
Schneider et al.

(10) Patent No.: US 12,117,888 B2
(45) Date of Patent: Oct. 15, 2024

(54) INTELLIGENT ALERT AUTOMATION (IAA)

(71) Applicant: Level 3 Communications, LLC, Broomfield, CO (US)

(72) Inventors: Kevin Schneider, Black Hawk, CO (US); Angela A. Rash, Severance, CO (US); Troy G. Pohl, Longmont, CO (US); Steven Burrell, Westminster, CO (US); Matthew D. Schoenfeldt, Meridian, ID (US); Shelli L. Hurd, Arvada, CO (US)

(73) Assignee: Level 3 Communications, LLC, Denver, CO (US)

( * ) Notice: Subject to any disclaimer, the term of this patent is extended or adjusted under 35 U.S.C. 154(b) by 90 days.

(21) Appl. No.: 17/961,858

(22) Filed: Oct. 7, 2022

(65) Prior Publication Data

US 2024/0070004 A1    Feb. 29, 2024

Related U.S. Application Data

(60) Provisional application No. 63/402,814, filed on Aug. 31, 2022.

(51) Int. Cl.
*G06F 11/00* (2006.01)
*G06F 11/07* (2006.01)

(52) U.S. Cl.
CPC ...... *G06F 11/0769* (2013.01); *G06F 11/0751* (2013.01)

(58) Field of Classification Search
CPC .......................... G06F 11/0769; G06F 11/0751
See application file for complete search history.

(56) References Cited

U.S. PATENT DOCUMENTS

| | | | |
|---|---|---|---|
| 6,513,129 B1* | 1/2003 | Tentij | H04L 43/0811 714/48 |
| 9,806,966 B2* | 10/2017 | Pugaczewski | H04L 41/5054 |
| 11,496,368 B2* | 11/2022 | Macieira | H04L 41/0853 |
| 2005/0172175 A1* | 8/2005 | Bhat | H04L 41/0659 714/43 |
| 2013/0191530 A1* | 7/2013 | Zhang | H04L 43/0858 709/224 |
| 2015/0288558 A1* | 10/2015 | Gates | G06F 11/079 714/57 |
| 2016/0241451 A1* | 8/2016 | Pugaczewski | H04L 12/42 |
| 2019/0004890 A1* | 1/2019 | Venkataraman | G06F 11/079 |
| 2021/0342214 A1* | 11/2021 | Madawat | G06F 11/3006 |
| 2022/0173980 A1* | 6/2022 | Yoon | G06N 20/00 |
| 2022/0368606 A1* | 11/2022 | Xue | H04L 41/5009 |

* cited by examiner

*Primary Examiner* — Amine Riad

(57) ABSTRACT

Novel tools and techniques are provided for implementing intelligent alert automation ("IAA"). In various embodiments, IAA receives alert/event feeds from several different alerting and ticketing systems via input Redis queues, and uses a triage system to determine whether to process the alert/event or disregard it. If so, IAA may create a flow instance, assign a unique instance ID, and place the flow instance in one of a plurality of jobs queues based on alert/event type and/or or source. An abattoir system retrieves a flow instance from one of the jobs queues (in order of the queue's priority), and processes the next node or step in the flow instance. The flow instance is placed back into the jobs queue for subsequent processing by the same or different abattoir system until no additional nodes or steps remain in the flow, at which point the flow instance is considered complete.

17 Claims, 10 Drawing Sheets

INTELLIGENT ALERT AUTOMATION (IAA)

CROSS-REFERENCES TO RELATED APPLICATIONS

This application claims priority to U.S. Patent Application Ser. No. 63/402,814 (the "'814 application"), filed Aug. 31, 2022, by Kevin Schneider et al., entitled, "Intelligent Alert Automation (IAA)," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network management, and, more particularly, to methods, systems, and apparatuses for implementing intelligent alert automation ("IAA").

BACKGROUND

Conventional network management systems are unable to handle all aspects of fault management. In the context of monitoring for faults, conventional network management systems only handle aspects of monitoring (e.g., only passive monitoring, only active polling, only pinging, and/or the like) network devices, but either do not utilize a broader suite of collection modalities and/or do not normalize alerts and/or do not enrich alerts with device, network, or other information, or the like, thereby resulting in incomplete information being presented to users or technicians, which prolongs resolution of network faults, requires further information gathering by the users or technicians, prolongs impact to the network and users or customers of network services, and so on. Conventional network management systems also rely primarily on manual operations by a technician, which requires significant amounts of time to address alerts or events that are monitored or tracked.

Hence, there is a need for more robust and scalable solutions for implementing network management, and, more particularly, to methods, systems, and apparatuses for implementing intelligent alert automation ("IAA").

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105a-105n, the integer value of n in 105n may be the same or different from the integer value of n in 110n for component #2 110a-110n, and so on.

DETAILED DESCRIPTION OF CERTAIN EMBODIMENTS

Overview

Figure 1:
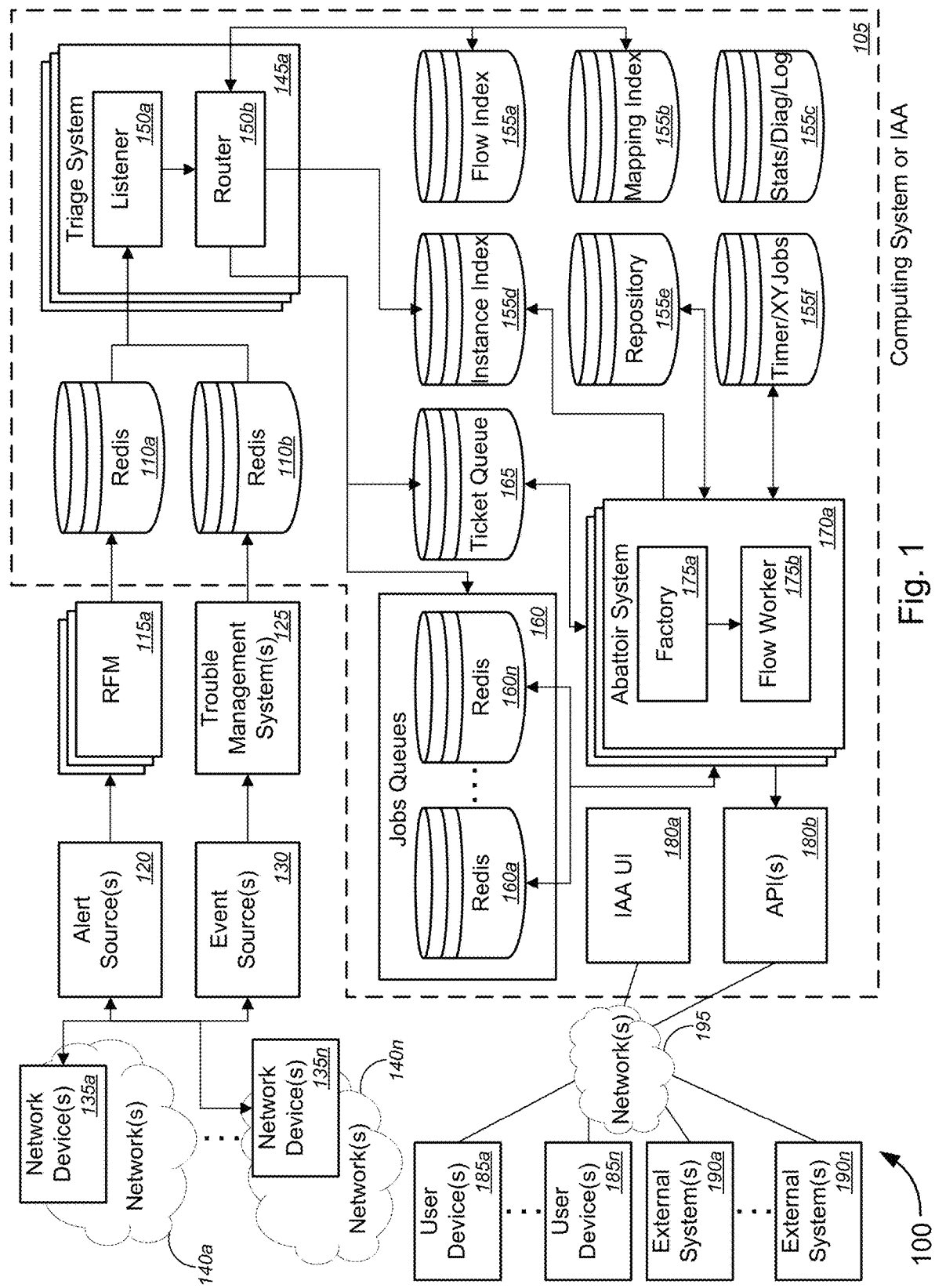
FIG. 1 is a schematic diagram illustrating a system for implementing intelligent alert automation ("IAA"), in accordance with various embodiments.

Various embodiments provide tools and techniques for implementing network management, and, more particularly, to methods, systems, and apparatuses for implementing intelligent alert automation ("IAA").

In various embodiments, IAA obtains or receives alert and/or event feeds from several different alerting and ticketing systems via one or more input Redis queues. These alerts and/or events go through a process called "triage", which determines whether IAA will process the alert/event through a workflow or disregard it. Based on a determination that IAA will process an alert or event, IAA may create an instance (including, but not limited to, an alert/event plus IAA flow or automation, or the like), may assign the instance a unique instance ID, may update an instance index, may place the flow instance in one of a plurality of jobs Redis queues based at least in part on one or more of type of alert, type of event, or source of alert or event (e.g., 911 alert, SMARTS or Metro Ethernet Network alert, network monitoring appliance ("NMA") alert, access gateway ("AG") alert, global Internet Protocol management system ("GIMS") alert, next generation 911 ("NG911") alert, deployable network operations center ("DNOC") alert, or an event alert, or the like, with the flow instances for all other alerts falling in a default alert queue), and/or may place a ticket event in a ticket queue 265. By taking an instance and placing it in one of these several Redis queues based on alert source, higher priority alerts (e.g., 911 alerts, etc.) may be processed faster.

An abattoir system retrieves a flow instance from one of the jobs Redis queues (in order of priority of the queue) and/or from a ticket queue, and processes the next node or step in the flow of the flow instance. If there are additional nodes in the flow or automation requiring processing, the flow instance is placed back into the jobs Redis queue for subsequent processing by the same or different abattoir system. The flow or automation will continue this cycle until there are no additional nodes or steps to process and the flow instance is considered complete.

In some embodiments, a plurality of triage systems may run on each of a plurality of servers, while a plurality of abattoir systems may run on each of the same, different, or overlapping plurality of servers. In this way, IAA is horizontally scalable by simply adding more servers to the cluster, thereby allowing IAA to process millions of alerts and events per day with about 1 million (or more) of those being routed to a workflow, which is a volume that most conventional systems cannot handle.

Overall, IAA has over 1000 flows or automations running as of the filing of this patent document. These flows or automations perform a range of functions from merely emailing to more complex functions like creating a Network Event and notifying many customers of the issue. In a use case example, at the beginning of the year that this patent document was filed, IAA, as a whole, saved NOCs approximately 21,500 hours per month, and 8 months later, the time savings has increased by almost 70%, with IAA saving NOCs approximately 36,400 hours per month. In some embodiments, IAA may be developed with a plug-and-play approach, allowing many users to be trained on how to build an IAA flow or automation. With over 190 functions at the time of filing of this patent document, this allows each NOC and small or medium-sized enterprise ("SME") to build a flow or automation that is unique to their needs.

These and other aspects of IAA are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise receiving, using a computing system, a first input that is either associated with a service or product provided by a service provider or associated with a network device via which the service or product is provided, the first input comprising one of a first alert or a first event among a plurality of alerts and/or events, the network device being disposed in a first network among a plurality of networks; and performing, using the computing system and using a triage system, triage operations, by: autonomously determining whether characteristics of the first input matches characteristics of a type of input associated with one workflow among a set of workflows; based on a determination that characteristics of the first input matches characteristics of a type of input associated with a first workflow among the set of workflows, performing the following: (i) autonomously mapping a first profile associated with the first input to the first workflow; (ii) autonomously creating a first flow instance based on the mapping; and (iii) autonomously placing the first flow instance in a selected storage queue among a plurality of storage queues based at least in part on one or more of type of alert, type of event, or source of alert or event, and/or the like; and based on a determination that characteristics of the first input does not match characteristics of the type of input associated with any of the set of workflows, performing one of the following: (i) autonomously creating a first trouble ticket for the first input, and placing the created first trouble ticket in a trouble ticket queue for a user to address; or (ii) ignoring the first input; and/or the like.

In some embodiments, the computing system may comprise at least one of a network management system server, a fault management system, an intelligent alert automation ("IAA") computing system, a network operations center ("NOC") computing system, a server over a network, a cloud computing system, or a distributed computing system, and/or the like.

According to some embodiments, autonomously determining whether characteristics of the first input matches characteristics of the type of input associated with one workflow among the set of workflows may comprise autonomously comparing the first profile with profile types for the type of input associated with each of one or more of the set of workflows.

In some embodiments, performing the triage operations may further comprise: autonomously determining whether the first input is duplicative of a previously received alert or event that either has been already queued for processing, has been processed, or has been dismissed; based on a determination that the first input is duplicative of a previously received alert or event, performing one or more of flagging the first input as being duplicative or ignoring the first input; and based on a determination that the first input is not duplicative of a previously received alert or event and based on the determination that characteristics of the first input matches characteristics of a type of input associated with a first workflow among the set of workflows, further performing the following: autonomously assigning a unique instance identifier ("ID") to the first flow instance, prior to autonomously placing the first flow instance in the selected storage queue.

According to some embodiments, the method may further comprise performing, using the computing system and using an abattoir system among a plurality of abattoir systems, abattoir operations based on priority of each storage queue among the plurality of storage queues, by: (a) autonomously retrieving the first flow instance from the selected storage queue when the first flow instance becomes next in line for processing in the selected storage queue and after flow instances in one or more higher priority storage queues have been processed; (b) autonomously performing at least one function for one node or step in the first flow instance corresponding to the first workflow, the first workflow comprising one or more nodes or steps; (c) based on a determination that a trouble ticket has not yet been created for the first flow instance and that at least one more node or step remains in the first workflow for processing, autonomously placing the first flow instance in the selected storage queue for either the same abattoir system or another abattoir system among the plurality of abattoir systems to process the next node or step in the first workflow; and (d) based on a determination that processing for the first flow instance has been completed and that a trouble ticket need not be created, autonomously clearing the first input and updating records to reflect clearing of the first input.

In some instances, the triage system may be among a plurality of triage systems that is disposed across a first plurality of servers in the plurality of networks. In some cases, the plurality of abattoir systems may be disposed across a second plurality of servers in the plurality of networks. In some instances, the first plurality of servers and the second plurality of servers may be one of the same set of servers, different sets of servers, or overlapping sets of servers. In some cases, the plurality of triage systems may concurrently perform triage operations in parallel, and the plurality of abattoir systems may concurrently perform abattoir operations in parallel.

In some cases, performing the abattoir operations may further comprise, while the first flow instance is being processed by the abattoir system, performing at least one of: autonomously updating a flow instance index to indicate that the first flow instance corresponding to the first input is currently being processed through a flow; or autonomously updating an alarm/event repository with updated information regarding processing of the first input; and/or the like.

In some instances, performing the abattoir operations may further comprise at least one of: autonomously calling a script to gather data; autonomously searching for other alerts or issues based on one or more devices; autonomously searching for other alerts or issues based on one or more circuits returned by a script; autonomously verify whether an alert or event is due to a maintenance activity; autonomously creating a trouble ticket; autonomously determining priority of a trouble ticket based on number of customers affected by an alert or event; autonomously adding one or more of script results, other alert data, circuit layout, circuit details, or other relevant data to a trouble ticket; autonomously sending messages regarding an alert or event and/or a trouble ticket to one or more users; or autonomously sending messages regarding an alert or event to one or more affected customers; and/or the like.

In some cases, the at least one function may comprise one or more of: an XY job function that returns a True value based on a determination that an alert or event occurs X number of times within a Y period, wherein X and Y are settable or resettable values; a timer function that holds a flow instance corresponding to an alert or event for a Z period before processing, wherein Z is a settable or resettable value; a part ordering function that makes a call via an application programming interface ("API") to a part ordering system based on data gathered during a workflow, that returns a True value if the part order is successful, and that returns a False value if an issue arises with the part order; at least one ticketing system function comprising one or more of an add note to ticket function, an assign ticket function, a change ticket title function, a close ticket function, a dispatch ticket function, or a search for ticket function; at least one alert system function comprising one or more of an add note to alert function, a clear alert function, a delete alert function, a create alert function, or an add ticket number function; a network device translation language protocol ("TL1") function that sends one or more TL1 commands to a network device, wherein the one or more TL1 commands comprise at least one of a command for the network device to gather and send data, a command for the network device to send status information, or a command to reset the network device; at least one notification function to call external APIs to send messages, the messages comprising one or more of e-mail messages, pages, communications platform messages to individuals, communications platform group messages, short message service ("SMS") messages, or multimedia messaging service ("MIMS") messages; at least one script function that puts a flow instance on hold while calling one or more external scripts to return with data; or an event outage function that identifies customers affected by an outage, that creates an event ticket for a user to monitor the outage, that sends updates to the user, and that creates all customer trouble tickets to keep customers informed of the outage; and/or the like.

In some instances, the plurality of storage queues may comprise a plurality of jobs queues that are each stored in one of a plurality of jobs remote dictionary server ("Redis") queues. In some cases, the plurality of jobs queues may comprise at least one of a 911 jobs queue, a Metro Ethernet Network jobs queue, a network monitoring appliance ("NMA") jobs queue, an access gateway ("AG") jobs queue, a global Internet Protocol management system ("GIMS") jobs queue, a next generation 911 ("NG911") jobs queue, a deployable network operations center ("DNOC") jobs queue, an event jobs queue, or a default jobs queue, and/or the like. In some instances, each of the plurality of jobs queues may have a priority relative to other jobs queues that dictates the order that the jobs queues are processed by the plurality of abattoir systems.

In some embodiments, receiving the first input may comprise receiving the first input from a Redis queue among one or more input Redis queues, at least one first Redis queue among the one or more input Redis queues storing alerts received from at least one real-time fault management system ("RFM"), and at least one second Redis queue among the one or more input Redis queues storing events received from at least one trouble management or ticketing system. In some cases, the trouble ticket queue may be stored in one or more ticket Redis queues.

According to some embodiments, the method may further comprise providing, using the computing system, an intelligent alert automation ("IAA") user interface ("UI") to the user, the IAA UI comprising at least one of: an instances tool configured to enable the user to list and/or search flow instances; a mapping tool configured to enable the user to map workflows and/or visualize mappings of workflows; a flow interface tool configured to enable the user to view and search existing workflows; a rules interface tool configured to enable the user to view, list, create, edit, search, and/or save rules; a testing tool configured to enable the user to test functions, flows, and/or rules; a flow creation and editing tool configured to enable the user to view, create, edit, validate, and/or save workflows; a deployment tool configured to enable the user to deploy code updates and/or deploy nodes in a workflow; or a ticket event profile tool configured to enable the user to view, list, create, edit, search, and/or save ticket events; and/or the like.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: receive a first input that is either associated with a service or product provided by a service provider or associated with a network device via which the service or product is provided, the first input comprising one of a first alert or a first event among a plurality of alerts and/or events, the network device being disposed in a first network among a plurality of networks; perform, using a triage system, triage operations, by: autonomously determining whether characteristics of the first input matches characteristics of a type of input associated with one workflow among a set of workflows; based on a determination that characteristics of the first input matches characteristics of a type of input associated with a first workflow among the set of workflows, performing the following: (i) autonomously mapping a first profile associated with the first input to the first workflow; (ii) autonomously creating a first flow instance based on the mapping; and (iii) autonomously placing the first flow instance in a selected storage queue among a plurality of storage queues based at least in part on one or more of type of alert, type of event, or source of alert or event; and based on a determination that characteristics of the first input does not match characteristics of the type of input associated with any of the set of workflows, performing one of the following: (i) autonomously creating a first trouble ticket for the first input, and placing the created first trouble ticket in a trouble ticket queue for a user to address; or (ii) ignoring the first input; and/or the like.

In some embodiments, the computing system may comprise at least one of a network management system server, a fault management system, an intelligent alert automation ("IAA") computing system, a network operations center ("NOC") computing system, a server over a network, a cloud computing system, or a distributed computing system, and/or the like.

According to some embodiments, the first set of instructions, when executed by the at least one first processor, may further cause the computing system to: perform, using an abattoir system among a plurality of abattoir systems, abattoir operations based on priority of each storage queue among the plurality of storage queues, by: (a) autonomously retrieving the first flow instance from the selected storage queue when the first flow instance becomes next in line for processing in the selected storage queue and after flow instances in one or more higher priority storage queues have been processed; (b) autonomously performing at least one function for one node or step in the first flow instance corresponding to the first workflow, the first workflow comprising one or more nodes or steps; (c) based on a determination that a trouble ticket has not yet been created for the first flow instance and that at least one more node or step remains in the first workflow for processing, autonomously placing the first flow instance in the selected storage queue for either the same abattoir system or another abattoir system among the plurality of abattoir systems to process the next node or step in the first workflow; and (d) based on a determination that processing for the first flow instance has been completed and that a trouble ticket need not be created, autonomously clearing the first input and updating records to reflect clearing of the first input.

In some instances, the triage system may be among a plurality of triage systems that is disposed across a first plurality of servers in the plurality of networks. In some cases, the plurality of abattoir systems may be disposed across a second plurality of servers in the plurality of networks. In some instances, the first plurality of servers and the second plurality of servers may be one of the same set of servers, different sets of servers, or overlapping sets of servers. In some cases, the plurality of triage systems may concurrently perform triage operations in parallel, and the plurality of abattoir systems may concurrently perform abattoir operations in parallel.

In some embodiments, receiving the first input may comprise receiving the first input from a remote dictionary server ("Redis") queue among one or more input Redis queues, at least one first Redis queue among the one or more input Redis queues storing alerts received from at least one real-time fault management system ("RFM"), and at least one second Redis queue among the one or more input Redis queues storing events received from at least one trouble management or ticketing system.

According to some embodiments, the first set of instructions, when executed by the at least one first processor, may further cause the computing system to: provide an intelligent alert automation ("IAA") user interface ("UI") to the user, the IAA UI comprising at least one of: an instances tool configured to enable the user to list and/or search flow instances; a mapping tool configured to enable the user to map workflows and/or visualize mappings of workflows; a flow interface tool configured to enable the user to view and search existing workflows; a rules interface tool configured to enable the user to view, list, create, edit, search, and/or save rules; a testing tool configured to enable the user to test functions, flows, and/or rules; a flow creation and editing tool configured to enable the user to view, create, edit, validate, and/or save workflows; a deployment tool configured to enable the user to deploy code updates and/or deploy nodes in a workflow; or a ticket event profile tool configured to enable the user to view, list, create, edit, search, and/or save ticket events; and/or the like.

In yet another aspect, a method may comprise receiving, using the computing system, a first input that is either associated with a service or product provided by a service provider or associated with a network device via which the service or product is provided, the first input comprising one of a first alert or a first event among a plurality of alerts and/or events, the network device being disposed in a first network among a plurality of networks; performing, using the computing system and using a triage system, triage operations that comprise: autonomously comparing a profile of the first input with profile types for the type of input associated with each of one or more workflows among a plurality of workflows; and based on a determination that the profile of the first input matches a profile type for the type of input associated with a first workflow among the one or more workflows, (i) autonomously mapping the profile of the first input to the first workflow, (ii) autonomously creating a first flow instance based on the mapping, and (iii) autonomously placing the first flow instance in a selected jobs queue among a plurality of jobs queues based at least in part on one or more of type of alert, type of event, or source of alert or event, the plurality of jobs queues each being stored in one of a plurality of jobs remote dictionary server ("Redis") queues; and performing, using the computing system and using an abattoir system among a plurality of abattoir systems, abattoir operations based on priority of each storage queue among the plurality of storage queues, by: (a) autonomously retrieving the first flow instance from the selected jobs queue when the first flow instance becomes next in line for processing in the selected jobs queue and after flow instances in one or more higher priority jobs queues have been processed; (b) autonomously performing at least one function for one node or step in the first flow instance corresponding to the first workflow, the first workflow comprising one or more nodes or steps; (c) based on a determination that at least one more node or step remains in the first workflow for processing, autonomously placing the first flow instance in the selected jobs queue for either the same abattoir system or another abattoir system among the plurality of abattoir systems to process the next node or step in the first workflow; and (d) based on a determination that processing for the first flow instance has been completed, autonomously clearing the first input and updating records to reflect clearing of the first input.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing network management, and, more particularly, to methods, systems, and apparatuses for implementing intelligent alert automation ("IAA"), as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing IAA, in accordance with various embodiments.

In the non-limiting embodiment of FIG. 1, system 100 may comprise a computing system or IAA system 105, which is a system that is configured to automate processes for handling both alerts monitored by at least one fault management system (e.g., real-time fault management system ("RFM") 115a-115n, or the like) and events monitored by at least one trouble management or ticketing system (e.g., trouble management or ticketing system 125, or the like). In some embodiments, RFM 115a-115n may be configured to receive alerts for and/or from network devices (including, but not limited to, at least one of layer 2 devices, layer 3 devices, and/or layer 4 devices corresponding to open systems interconnection ("OSI") model's data link layer, network layer, and/or transport layer, respectively, or the like) that are disposed in one or more disparate networks, and to enrich, aggregate, and display the alerts on a user interface ("UI") of the fault management system (e.g., "RFM UI" or the like) to facilitate addressing of the alert(s) by a user(s). In some cases, the user(s) may include, without limitation, technicians who add or remove network devices and/or people who need access to such network devices, as listed or identified by network operations center ("NOC") managers, or the like. RFM 115a-115n is described in greater detail in U.S. patent application Ser. No. 17/987,316, filed Nov. 15, 2022, by Steve Toms et al., entitled, "Real-Time Fault Management (RFM)," which claims priority to U.S. Patent Application Ser. No. 63/402,812 (the "'812 Application"), filed Aug. 31, 2022, by Steve Toms et al., entitled, "Real-Time Fault Management (RFM)," the disclosure of each of which is incorporated herein by reference in its entirety for all purposes. According to some embodiments, trouble management or ticketing system 125 may be configured to monitor events or ticket events, or the like.

In some embodiments, the computing system or IAA system 105 may include, without limitation, at least one of one or more databases 110a and 110b, each including, but not limited to, at least one of a remote dictionary server ("Redis") database or cluster, a non-relational ("NoSQL") database, or a relational (or structured query language ("SQL")) database, and/or the like; one or more RFMs 115a-115n (collectively, "RFMs 115" or the like), as described above; one or more alert sources 120; trouble management or ticketing system(s) 125; and one or more event sources 130; and/or the like.

In some instances, the one or more alert sources 120 may include, but are not limited to, at least one of one or more event correlation and automation systems, one or more network monitoring appliances ("NMAs"), a global Internet Protocol management system ("GIMS") configured to monitor and collect alerts from layer 2 and layer 3 devices, one or more network management system ("NMS") servers and a plurality of software-based network probes (collectively, "NMS and Probes" or the like) configured to monitor layer 4 devices, or one or more legacy NMSs, and/or the like. GIMS is described in greater detail in U.S. patent application Ser. No. 18/358,756, filed Jul. 26, 2023, by Steve Toms et al., entitled, "Global Internet Protocol Management System (GIMS) for Monitoring Network Devices for Fault Management," which claims priority to U.S. Patent Application Ser. No. 63/410,733 (the "'733 Application"), filed Sep. 28, 2022, by Steve Toms et al., entitled, "Global Internet Protocol Management System (GIMS) for Monitoring Network Devices for Fault Management," and U.S. Patent Application Ser. No. 63/410,749 (the "'749 Application"), filed Sep. 28, 2022, by Steve Toms et al., entitled, "Software-Based Network Probes for Monitoring Network Devices for Fault Management," the disclosure of each of which is incorporated herein by reference in its entirety for all purposes. NMS and Probes (and their components) are described in greater detail in U.S. patent application Ser. No. 18/358,771, filed Jul. 26, 2023, by Steve Toms et al., entitled, "Software-Based Network Probes for Monitoring Network Devices for Fault Management," which claims priority to '733 and '749 Applications, the disclosure of each of which has already been incorporated herein by reference in its entirety for all purposes.

The one or more alert sources 120 monitor, track, and store/collect alerts from one or more network devices 135a-135n (collectively, "network devices 135" or the like) that are located or disposed in the networks 140a-140n (collectively, "networks 140" or the like). In some instances, the one or more network devices 135 may each include, without limitation, at least one of a layer 2 switch or network switch (e.g., an Ethernet switch or other media access control ("MAC") address-based network switch, or the like), a layer 2 network hub (e.g., an Ethernet hub or other MAC-based network switch, or the like), a bridge, a modem, a network card, an access point, a layer 3 switch or network switch (e.g., an Internet Protocol ("IP") address-based network switch, or the like), a router, a layer 4 switch, a gateway device, a network node, a gateway node, a firewall, an optical network switch and routing platform, a wavelength division multiplexing ("WDM")-based optical transport network system, or a network transmission system, and/or the like. The alerts and/or alert data that are monitored, tracked, and collected by the one or more alert sources 120 are subsequently enriched, aggregated, and placed in database 110a (which, in some cases, may include a Redis cluster or queue), by the one or more RFMs 115. In a similar manner, the one or more event sources 130 monitor, track, and store/collect alerts from the one or more network devices 135 that are located or disposed in the networks 140. The events, ticket events, event data, and/or ticket event data that are monitored, tracked, and collected by the one or more event sources 130 are subsequently collected and placed in database 110*b* (which, in some cases, may include a Redis cluster or queue) by trouble management or ticketing system(s) 125. In some cases, the plurality of networks 140 may include, but is not limited to, two or more disparate networks utilizing different alert management protocols and different fault management protocols.

System 100 may further comprise one or more triage systems 145*a*-145*n* (collectively, "triage systems 145" or the like), each including a listener 150*a* and a router 150*b*, or the like; one or more indices or databases 155*a*-155*f* (including, but not limited to, at least one of a flow index 155*a*, a mapping index 155*b*, a statistics/diagnostics/logging database 155*c*, an instance or flow instance index 155*d*, an alert/event repository 155*e*, or a timer and XY Jobs cache 155*f*, and/or the like); one or more storage or jobs queues 160*a*-160*n*, which may each be stored in one of a plurality of jobs Redis queues or the like (collectively, "storage queues 160," "jobs queues 160," "Redis queues 160," or "Jobs Redis queues 160," or the like); one or more trouble ticket queues 165, which, in some cases, may be stored in one or more ticket Redis queues (collectively, "ticket queue(s) 165," "trouble ticket queue(s) 165," "Ticket Redis queue(s) 165," or the like); one or more alert/event abattoir systems 170*a*-170*n* (collectively, "abattoir systems 170" or the like), each including a factory 175*a* and a flow worker 175*b*, or the like; an IAA user interface ("UI") 180*a*; one or more application programming interfaces ("APIs") 180*b*; one or more user devices 185*a*-185*n* (collectively, "user devices 185" or the like); one or more external systems 190*a*-190*n* (collectively, "external systems 190" or the like); and one or more networks 195; and/or the like. In some instances, the one or more user devices 185 may each include, but is limited to, one of a desktop computer, a laptop computer, a tablet computer, a smart phone, a mobile phone, a NOC computing system or console, or any suitable device capable of communicating with IAA UI 180*a*) via a web-based portal, an API (e.g., API 180*b*, or the like), a server, a software application ("app"), or any other suitable communications interface, or the like, over network(s) 195. In some cases, the one or more external systems 190 may each include, without limitation, one of a ticketing system, a communications system, a translation language protocol ("TL1")-based system, a simple network management protocol ("SNMP")-based system, or a part or parts ordering system, and/or the like.

In some embodiments, network(s) 140 and/or 195 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 140 and/or 195 may include an access network of the service provider (e.g., an Internet service provider ("ISP")). In another embodiment, the network(s) 140 and/or 195 may include a core network of the service provider and/or the Internet.

In operation, one or more of the computing system or IAA system 105, at least one triage system among the one or more triage systems 145, or at least one abattoir system among the one or more abattoir systems 170 (collectively, "computing system" or the like) may receive a first input that is either associated with a service or product provided by a service provider or associated with a network device (e.g., network device(s) 135 or the like) via which the service or product is provided. In some cases, the first input may include, without limitation, one of a first alert or a first event among a plurality of alerts and/or events, and the network device may be disposed in a first network among the one or more networks 140. According to some embodiments, receiving the first input may comprise receiving the first input from a Redis queue among one or more input Redis queues (e.g., Redis queue 110*a* or 110*b*, or the like), at least one first Redis queue (e.g., Redis queue 110*a*) among the one or more input Redis queues storing alerts received from at least one RFM (e.g., RFM(s) 115, or the like), and at least one second Redis queue (e.g., Redis queue 110*b*) among the one or more input Redis queues storing events received from at least one trouble management or ticketing system (e.g., trouble management or ticketing system(s) 125, or the like).

In some embodiments, the computing system may perform, using triage system(s) 145, triage operations, by: (a) autonomously determining whether characteristics of the first input matches characteristics of a type of input associated with one workflow among a set of workflows; (b) based on a determination that characteristics of the first input matches characteristics of a type of input associated with a first workflow among the set of workflows, performing the following: (i) autonomously mapping a first profile associated with the first input to the first workflow (in some cases, using flow index 155*a* and/or mapping index 155*b*, or the like); (ii) autonomously creating a first flow instance based on the mapping (and, in some cases, updating instance index 155*d*, or the like); and (iii) autonomously placing the first flow instance in a selected storage queue among a plurality of storage queues (e.g., jobs queues 160, or the like) based at least in part on one or more of type of alert, type of event, or source of alert or event, and/or the like; and (c) based on a determination that characteristics of the first input does not match characteristics of the type of input associated with any of the set of workflows, performing one of the following: (i) autonomously creating a first trouble ticket for the first input, and placing the created first trouble ticket in a trouble ticket queue (e.g., ticket queue 165, or the like) for a user to address; or (ii) ignoring the first input; and/or the like. In some cases, the trouble ticket queue (e.g., ticket queue 165, or the like) may be stored in one or more ticket Redis queues, in a similar manner as the alerts and events being stored in Input Redis queues 110*a* and 110*b*, or jobs being stored in Jobs Redis queues 160, or the like.

According to some embodiments, autonomously determining whether characteristics of the first input matches characteristics of the type of input associated with one workflow among the set of workflows may comprise autonomously comparing the first profile with profile types for the type of input associated with each of one or more of the set of workflows. In some instances, the plurality of storage queues (e.g., jobs queues 160, or the like) may include a plurality of jobs queues that are each stored in one of a plurality of jobs Redis queues. In some cases, the plurality of jobs queues may include, but is not limited to, at least one of a 911 jobs queue, a Metro Ethernet Network jobs queue, a network monitoring appliance ("NMA") jobs queue, an access gateway ("AG") jobs queue, a global Internet Protocol management system ("GIMS") jobs queue, a next generation 911 ("NG911") jobs queue, a deployable network operations center ("DNOC") jobs queue, an event jobs queue, or a default jobs queue, and/or the like. In some instances, each of the plurality of jobs queues may have a priority relative to other jobs queues that dictates the order that the jobs queues are processed by the plurality of abattoir systems. For example, 911 jobs have priority over all other jobs, and all jobs have priority over the default jobs, and so on.

In some embodiments, performing the triage operations may further comprise: (d) autonomously determining whether the first input is duplicative of a previously received alert or event that either has been already queued for processing, has been processed, or has been dismissed; (i) based on a determination that the first input is duplicative of a previously received alert or event, performing one or more of flagging the first input as being duplicative or ignoring the first input; and based on a determination that the first input is not duplicative of a previously received alert or event [from process (d) above] and based on the determination that characteristics of the first input matches characteristics of a type of input associated with a first workflow among the set of workflows [from process (b) above], further performing the following: (iv) autonomously assigning a unique instance identifier ("ID") to the first flow instance, prior to autonomously placing the first flow instance in the selected storage queue [from process (b)(iii) above].

According to some embodiments, the computing system may perform, using an abattoir system among a plurality of abattoir systems (e.g., the one or more abattoir systems 170, or the like), abattoir operations based on priority of each storage queue among the plurality of storage queues, by: (a) autonomously retrieving the first flow instance from the selected storage queue (e.g., jobs queues 160, or the like) when the first flow instance becomes next in line for processing in the selected storage queue and after flow instances in one or more higher priority storage queues have been processed; (b) autonomously performing at least one function for one node or step in the first flow instance corresponding to the first workflow, the first workflow comprising one or more nodes or steps; (c) based on a determination that a trouble ticket has not yet been created for the first flow instance and that at least one more node or step remains in the first workflow for processing, autonomously placing the first flow instance in the selected storage queue for either the same abattoir system or another abattoir system among the plurality of abattoir systems to process the next node or step in the first workflow; and (d) based on a determination that processing for the first flow instance has been completed and that a trouble ticket need not be created, autonomously clearing the first input and updating records (e.g., instance index 155d and/or repository 155e, and/or the like) to reflect clearing of the first input.

In some instances, the triage system may be among a plurality of triage systems that is disposed across a first plurality of servers in the plurality of networks. In some cases, the plurality of abattoir systems may be disposed across a second plurality of servers in the plurality of networks. In some instances, the first plurality of servers and the second plurality of servers may be one of the same set of servers, different sets of servers, or overlapping sets of servers. In some cases, the plurality of triage systems may concurrently perform triage operations in parallel, and the plurality of abattoir systems may concurrently perform abattoir operations in parallel.

In some cases, performing the abattoir operations may further comprise, while the first flow instance is being processed by the abattoir system, performing at least one of: autonomously updating a flow instance index (e.g., instance index 155d, or the like) to indicate that the first flow instance corresponding to the first input is currently being processed through a flow; or autonomously updating an alarm/event repository (e.g., repository 155e, or the like) with updated information regarding processing of the first input; and/or the like.

In some instances, performing the abattoir operations may further comprise at least one of: autonomously calling a script to gather data; autonomously searching for other alerts or issues based on one or more devices; autonomously searching for other alerts or issues based on one or more circuits returned by a script; autonomously verify whether an alert or event is due to a maintenance activity; autonomously creating a trouble ticket; autonomously determining priority of a trouble ticket based on number of customers affected by an alert or event; autonomously adding one or more of script results, other alert data, circuit layout, circuit details, or other relevant data to a trouble ticket; autonomously sending messages regarding an alert or event and/or a trouble ticket to one or more users; or autonomously sending messages regarding an alert or event to one or more affected customers; and/or the like.

In some cases, the at least one function may include, but is not limited to, one or more of: (1) an XY job function (e.g., using timer and XY jobs cache 155f, or the like) that returns a True value based on a determination that an alert or event occurs X number of times within a Y period, where X and Y are settable or resettable values; (2) a timer function that holds a flow instance corresponding to an alert or event for a Z period (e.g., using timer and XY jobs cache 155f, or the like) before processing, where Z is a settable or resettable value; (3) a part ordering function that makes a call via an API (e.g., API 180b, or the like) to a part ordering system (e.g., one of external systems 190, or the like) based on data gathered during a workflow, that returns a True value if the part order is successful, and that returns a False value if an issue arises with the part order; at least one ticketing system function comprising one or more of an add note to ticket function, an assign ticket function, a change ticket title function, a close ticket function, a dispatch ticket function, or a search for ticket function; at least one alert system function comprising one or more of an add note to alert function, a clear alert function, a delete alert function, a create alert function, or an add ticket number function; a network device translation language protocol ("TL1") function that sends one or more TL1 commands to a network device, where the one or more TL1 commands comprise at least one of a command for the network device to gather and send data, a command for the network device to send status information, or a command to reset the network device; at least one notification function to call external APIs (e.g., API(s) 180b, or the like) to send messages (e.g., via communications systems among the external systems 190, or the like), the messages including, but not limited to, one or more of e-mail messages, pages, communications platform messages to individuals, communications platform group messages, short message service ("SMS") messages, or multimedia messaging service ("MMS") messages, and/or the like; at least one script function that puts a flow instance on hold while calling one or more external scripts to return with data; or an event outage function that identifies customers affected by an outage, that creates an event ticket for a user to monitor the outage, that sends updates to the user, and that creates all customer trouble tickets to keep customers informed of the outage; and/or the like.

According to some embodiments, the computing system may provide an IAA UI (e.g., IAA UI 180a, or the like)) to the user, the IAA UI including, without limitation, at least one of: an instances tool (as shown, e.g., in FIG. 3C, or the like) configured to enable the user to list and/or search flow instances; a mapping tool configured to enable the user to map workflows and/or visualize mappings of workflows; a flow interface tool configured to enable the user to view and search existing workflows; a rules interface tool (as shown, e.g., in FIG. 3B, or the like) configured to enable the user to view, list, create, edit, search, and/or save rules; a testing tool (as shown, e.g., in FIG. 3D, or the like) configured to enable the user to test functions, flows, and/or rules; a flow creation and editing tool (as shown, e.g., in FIG. 3A, or the like) configured to enable the user to view, create, edit, validate, and/or save workflows; a deployment tool configured to enable the user to deploy code updates and/or deploy nodes in a workflow; or a ticket event profile tool configured to enable the user to view, list, create, edit, search, and/or save ticket events; and/or the like.

These and other functions of the system 100 (and its components) are described in greater detail below with respect to FIGS. 2-4.

Figure 2:
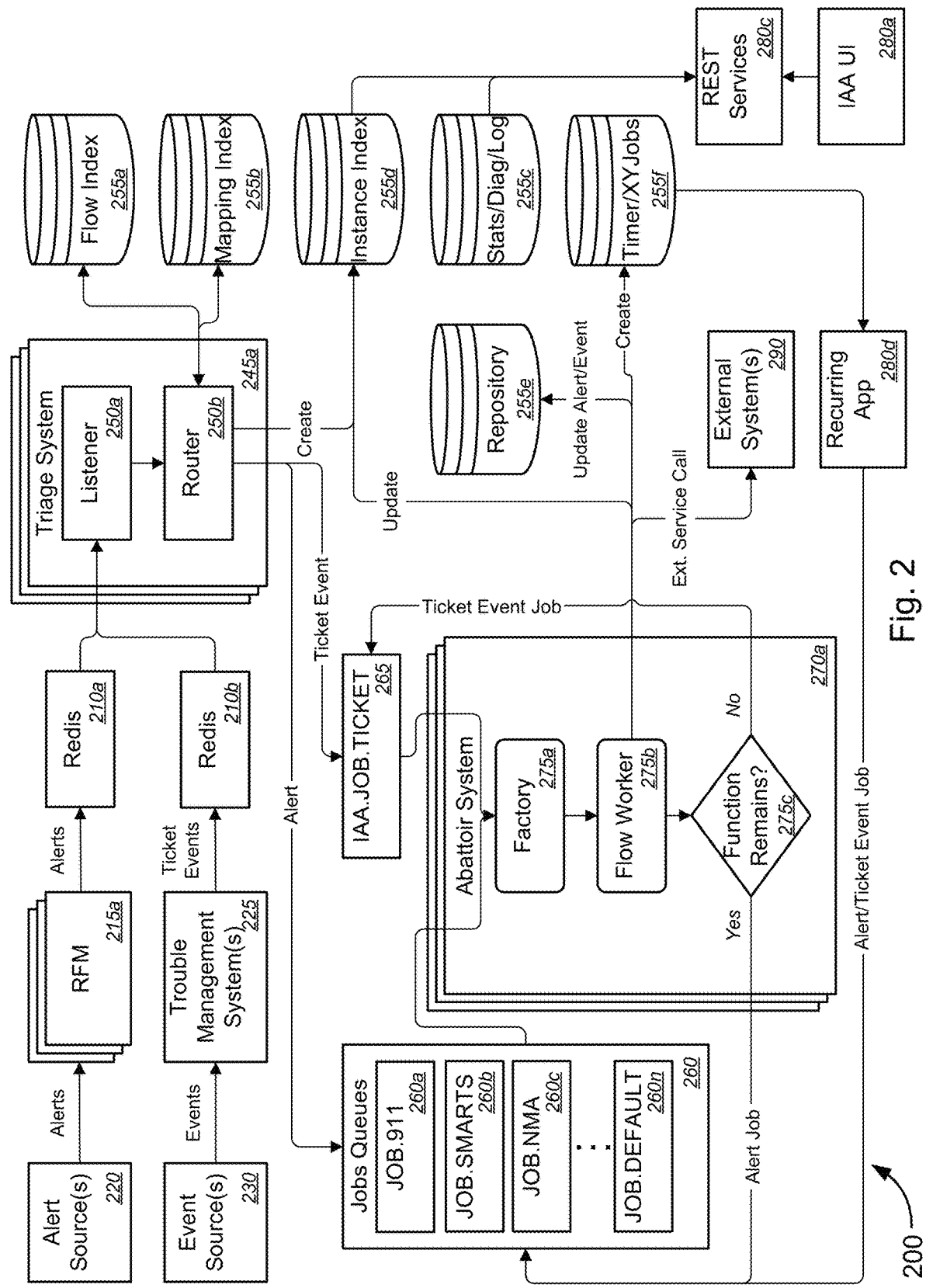
FIG. 2 is a schematic diagram illustrating a non-limiting example of a process flow for implementing IAA, in accordance with various embodiments.

FIG. 2 is a schematic diagram illustrating a non-limiting example 200 of a process flow for implementing IAA, in accordance with various embodiments.

In some embodiments, Redis queues or clusters 210a and 210b, RFM(s) 215a-215n, alert source(s) 220, trouble management and ticketing system(s) 225, event source(s) 230, triage system(s) 245a-245n, listener 250a, router 250b, flow index 255a, mapping index 255b, statistics/diagnostics/logging database 255c, instance or flow instance index 255d, alert/event repository 255e, timer and XY Jobs cache 255f, jobs queues 260 and 260a-260n, ticket queue(s) 265, abattoir systems 270a-270n, factory 275a, flow worker 275b, IAA UI 280a, external system(s) 290 of FIG. 2 may be similar, if not identical, to the one or more databases 110a and 110b, the RFM(s) 115a-115n, alert source(s) 120, trouble management and ticketing system(s) 125, event source(s) 130, triage system(s) 145a-145n, listener 150a, router 150b, flow index 155a, mapping index 155b, statistics/diagnostics/logging database 155c, instance or flow instance index 155d, alert/event repository 155e, timer and XY Jobs cache 155f, jobs queues 160 and 160a-160n, ticket queue(s) 165, abattoir systems 170a-170n, factory 175a, flow worker 175b, IAA UI 180a, external system(s) 190, respectively, of system 100 of FIG. 1, and the description of these components of system 100 of FIG. 1 are similarly applicable to the corresponding components of FIG. 2.

In the non-limiting example of FIG. 2, IAA obtains or receives alert and/or event feeds from several different alerting and ticketing systems (e.g., RFM(s) 215a-215n from alert source(s) 220, as well as trouble management and ticketing system(s) 225 from event source(s) 230, or the like) via one or more Redis queues (e.g., Redis queues 210a and 210b, or the like). These alerts and/or events go through a process in IAA called "triage" (e.g., via listener 250a and router 250b of triage system(s) 245a-245n, or the like), which determines whether IAA will process the alert/event through a workflow or disregard it, in some cases, by checking the flow index (e.g., flow index 255a, or the like) and/or by mapping the alert to a flow (e.g., using mapping index 255b, or the like). Based on a determination that IAA will process an alert or event, the triage system 245 may create an instance (including, but not limited to, an alert/event plus IAA flow or automation, or the like), may assign the instance a unique instance ID, may update an instance index (e.g., instance index 255d, or the like), may place the flow instance in one of the jobs or Redis queues 260 based at least in part on one or more of type of alert, type of event, or source of alert or event (e.g., 911 alert, SMARTS or Metro Ethernet Network alert, network monitoring appliance ("NMA") alert, access gateway ("AG") alert, global Internet Protocol management system ("GIMS") alert, next generation 911 ("NG911") alert, deployable network operations center ("DNOC") alert, or an event alert, or the like, with the flow instances for all other alerts falling in a default alert queue), and/or may place a ticket event in a ticket queue 265. By taking an instance and placing it in one of these several Redis queues based on alert source, higher priority alerts (e.g., 911 alerts, etc.) may be processed faster.

The abattoir system 270 retrieves (using factory 275a, or the like) a flow instance from one of the jobs or Redis queues 260 (in order of priority of the queue) and/or from the ticket queue 265, and processes (using flow worker 275b, or the like) the next node or step in the flow of the flow instance. As shown in the example flow in FIG. 3A, a flow instance may have a plurality of nodes or steps, and the abattoir processes (using flow worker 275b, or the like) one of these using one function (or at least one function) selected from a plurality of functions, for each iteration through the abattoir system. If there are additional nodes in the flow or automation requiring processing (as determined at block 275c, or the like), the flow instance is placed back into the Redis queue 260. The flow or automation will continue this cycle until there are no additional nodes or steps to process and the flow instance is considered complete. According to some embodiments, each node or step need not be processed by the same abattoir system, and any one abattoir system may retrieve the flow instance from the jobs queue 260 and process the next node or step in the flow. In this manner, a server can go offline (either for a hardware issue or a software update) and the flow instance will not be lost, as it will continue to be processed by other servers. In some embodiments, the flow worker 275 may update the instance index 255d, may update the alert/event repository 255e, and/or may make external service calls to the one or more external systems 290, or the like. In some cases, if no additional nodes remain, the ticket event job may be placed in the ticket queue 265 for a user to review. In some instances, representational state transfer ("REST") services 280c may be used to provide an interface between IAA UI 280a and one or more of the instance index 255d and/or the statistics/diagnostics/logging database 155c.

In some cases, functions may include small pieces of code (e.g., JAVA® code, or the like) that either run an internal API or an external API. In some instances, functions eitehr return a True or a False value, which allows the flow or automation to process down an applicable path. Many of the functions mimic what a user or technician would manually do, but does so many times faster. In some cases, the at least one function may include, but is not limited to, one or more of: (1) an XY job function, (2) a timer function, (3) a part ordering function, (4) at least one ticketing system function, (5) at least one alert system function, (6) a network device translation language protocol ("TL1") function, (7) at least one notification function, (8) at least one script function, or (9) an event outage function, and/or the like.

Regarding (1), the XY job function (using timer and XY jobs cache 255f and recurring app 280d, or the like) returns a True value based on a determination that an alert or event occurs X number of times within a Y period, where X and Y are settable or resettable values (e.g., assuming X=5 and Y=10 minutes, if IAA received 5 alerts for the same device in 10 minutes, then the function would return a True value and the flow or automation would take the True path). This function may be used to ensure that IAA does not call a system multiple times or to bypass a timer when there are additional alerts for a particular device. Regarding (2), the timer function (using timer and XY jobs cache 255*f* and recurring app 280*d*, or the like) holds a flow instance corresponding to an alert or event for a Z period before processing, where Z is a settable or resettable value. This function may be used to hold the Alert for a timeframe before processing in case the Alert clears. Regarding (3), the part ordering function makes a call via an API to a part ordering system (e.g., one of external systems 290, or the like) based on data gathered during a workflow, returns a True value if the part order is successful, and returns a False value if an issue arises with the part order. Regarding (4), the at least one ticketing system function may include, without limitation, one or more of an add note to ticket function, an assign ticket function, a change ticket title function, a close ticket function, a dispatch ticket function, or a search for ticket function, and/or the like. Regarding (5), the at least one alert system function may include, but is not limited to, one or more of an add note to alert function, a clear alert function, a delete alert function, a create alert function, or an add ticket number function, and/or the like.

Regarding (6), the TL1 function sends one or more TL1 commands to a network device, where the one or more TL1 commands may include, but are not limited to, at least one of a command for the network device to gather and send data, a command for the network device to send status information, or a command to reset the network device, and/or the like. This function may be used to resolve an issue by self-healing the device on the network. Regarding (7), the at least one notification function calls external APIs to send messages, the messages may include, without limitation, one or more of e-mail messages, pages, communications platform messages to individuals, communications platform group messages, short message service ("SMS") messages, or multimedia messaging service ("MMS") messages, and/or the like. These functions provide the flow creator with multiple ways to notify users or technicians of an issue on the network or to notify a group that a flow or automation has failed. Regarding (8), the at least one script function puts a flow instance on hold while calling one or more external scripts to return with data. This function may be used to call more complex actions needed to either gather data from devices that IAA servers cannot directly reach or to try to self-heal the devices on the network. Regarding (9), the event outage function identifies customers affected by an outage, creates an event ticket for a user or technician to monitor the outage, sends updates to the user or technician, and/or creates all customer trouble tickets to keep customers informed of the outage; and/or the like. On average this function takes less than 15 minutes to identify an outage and to sent out notifications to customers. If done manually, this process potentially takes over an hour.

In some embodiments, a plurality of triage systems may run on each of a plurality of servers, while a plurality of abattoir systems may run on each of the same, different, or overlapping plurality of servers. In this way, IAA is horizontally scalable by simply adding more servers to the cluster, thereby allowing IAA to process millions of alerts and events per day with about 1 million (or more) of those being routed to a workflow, which is a volume that most conventional systems cannot handle.

FIGS. 3A-3D (collectively, "FIG. 3") are schematic diagrams illustrating a non-limiting example 310 of an IAA UI that may be used when implementing IAA, in accordance with various embodiments.

The embodiment as represented in FIG. 3 is merely illustrative and is not intended to limit the scope of the various embodiments. For example, although a tablet computer is shown as the user device 300, any suitable user device—including, but not limited to, user device(s) 185, which may each include, but is limited to, one of a desktop computer, a laptop computer, a tablet computer, a smart phone, a mobile phone, a NOC computing system or console, or any suitable device capable of communicating with computing system or IAA system 105 (or with IAA UI 180*a* or 280*a*, or the like) via a web-based portal, an API (e.g., API(s) 180*b*, or the like), a server, an app, or any other suitable communications interface, or the like, over network(s) 195, and the like—may be used.

As shown in the embodiment of FIG. 3, user device 300 may comprise a device housing 305 and a display 305*a* (which may be a touchscreen display or a non-touchscreen display). An app, an application window, program window or portal (e.g., web portal or the like) may be displayed on the display 305*a*. In the non-limiting example of FIG. 3, the app or portal 310 running on the user device 300 is a user interface illustrating an IAA UI (in some cases, including "IAA UI" or the like), although the various embodiments are not limited to such an app or portal, as described herein, and can be any suitable app or portal. The app or portal 310 displayed in display 305*a* may provide a user (e.g., a technician, a telephone agent, a web-based agent, a chat agent, or other representative, etc. of the service provider, and/or the user as described above with respect to FIG. 1, or the like) with the ability, functionality, or options to enable the user to list and/or search flow instances (e.g., using an instances tool (as shown, e.g., in FIG. 3C, or the like), or the like); to enable the user to map workflows and/or visualize mappings of workflows (e.g., using a mapping tool configured, or the like); to enable the user to view and search existing workflows (e.g., using a flow interface tool, or the like); to enable the user to view, list, create, edit, search, and/or save rules (e.g., using a rules interface tool, as shown, e.g., in FIG. 3B, or the like); to enable the user to test functions, flows, and/or rules (e.g., using a testing tool, as shown, e.g., in FIG. 3D, or the like); to enable the user to view, create, edit, validate, and/or save workflows (e.g., using a flow creation and editing tool, as shown, e.g., in FIG. 3A, or the like); to enable the user to deploy code updates and/or deploy nodes in a workflow (e.g., using a deployment tool, or the like); or to enable the user to view, list, create, edit, search, and/or save ticket events (e.g., using a ticket event profile tool, or the like); and/or the like, or any suitable functionality of the IAA UI (such as described herein in detail with respect to FIGS. 1, 2, and 4, or the like).

Figure 3A:
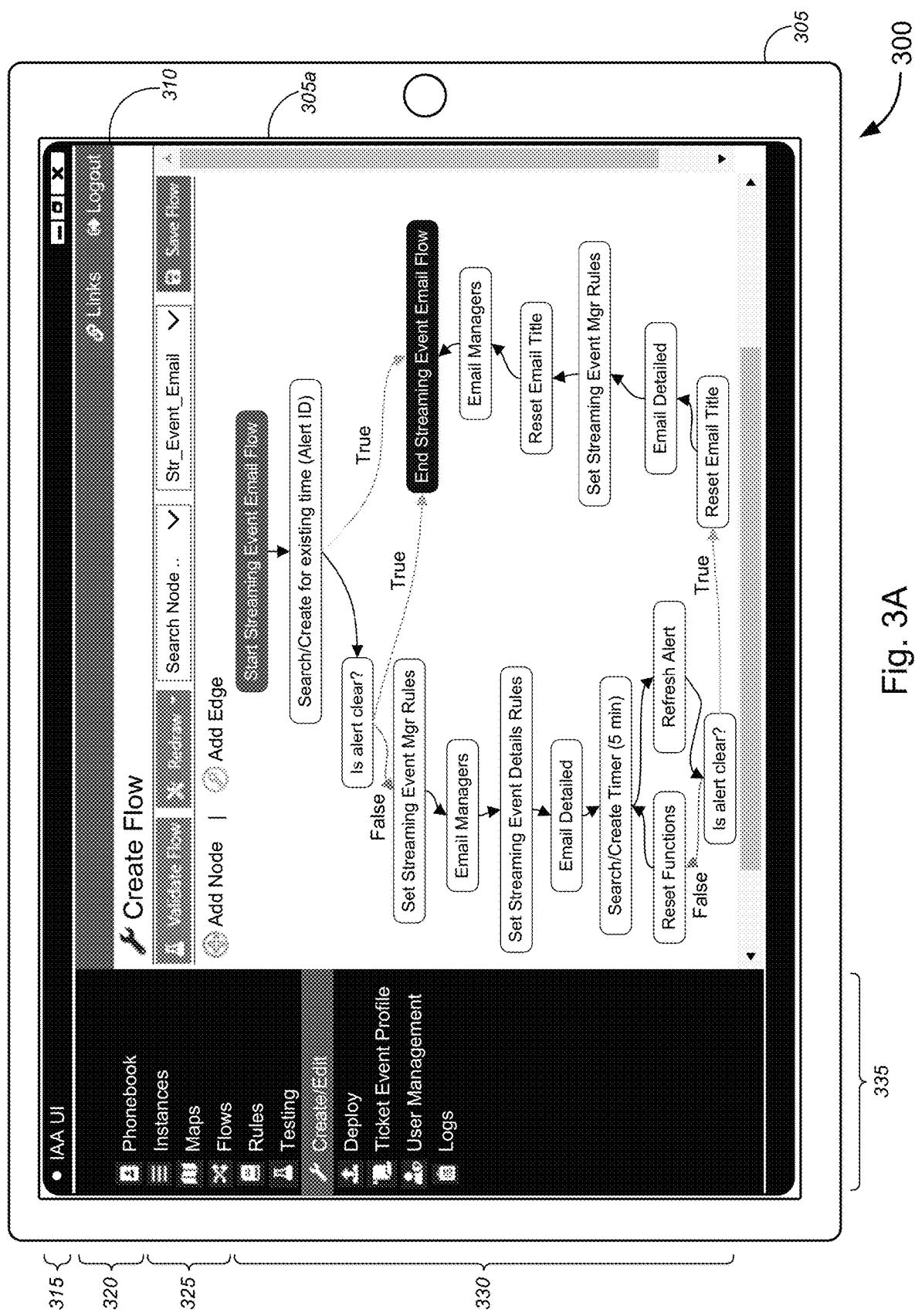
FIGS. 3A-3D are schematic diagrams illustrating a non-limiting example of an IAA UI that may be used when implementing IAA, in accordance with various embodiments.

As shown in the non-limiting example of FIG. 3A, the app or portal 310 may include, without limitation, at least one of a header portion 315 (e.g., indicating the app or portal site as "IAA UI" or the like), a title portion 320 (e.g., indicating the functionality(ies) being offered by the IAA UI, in this case, "Create Flow," and one or more virtual buttons or options (e.g., for generating links and for logging out, or the like)), a flow tools portion 325 (including one or more virtual buttons or options (e.g., for validating, redrawing, and/or saving a flow, for adding a node and/or an edge in the flow, or the like), one or more entry fields (e.g., for searching for a node and/or for entering or selecting a flow, and/or the like)), a flow drawing portion 330 for drawing nodes, edges, lines, conditions, etc. for a flow, or a menu portion 335 (including menu options for selecting one of a phonebook tool, an instances tool, a mapping tool, a flow interface tool, a rules interface tool, a testing tool, a flow creation and editing tool (which is highlighted here as it has been selected), a deployment tool, a ticket event profile tool, a user management tool, or a logs tool, or the like), and/or the like.

In the example flow as shown in FIG. 3A (in this case, "Streaming Event Email Flow," which may include a flow for updating a NOC as well as a customer (e.g., a broadcaster of the streaming content) with alerts/events or issues regarding streaming (whether live streaming or on-demand streaming) of the streaming content (including, but not limited to, to sporting events (e.g., an NFL game, an NBA game, an NHL game, an MLB game, or the like), a concert, a political event, a festival, etc.). The flow as shown in FIG. 3A represents an IAA automation that monitors circuits and network devices used for the streaming content. If an issue arises with one or more circuits and/or one or more network devices, the automation sends out two emails, one to the NOC and one to a mailbox that is monitored by an external application. The external application takes the email and updates a webpage (in some cases, a live webpage) to show what circuits and/or network devices are down (i.e., not fully operational) and up (i.e., operational), and the customer (in this case, the broadcaster) can use this webpage to ensure there are no issues with the broadcast or streaming of the streaming content. The automation then loops until the alert clears and then it will send out a clear message to both mailboxes.

Alternative flows (not shown) may include, without limitation, a 911 flow, a Metro Ring flow, a fiber cut flow, and/or the like. In the 911 flow example, IAA may include one or more automations to address issues, the one or more automations including, but not limited to, one or more of retrieving or obtaining circuit details that are not provided in the alert from an external database; creating a trouble ticket and adding the circuit details to the trouble ticket (so that a user or technician need not manually lookup the information); searching for other alerts and issues to determine if the affected circuit(s), the 911 service, and/or the customer's 911 system is completely down (i.e., not operational at all) or just impaired; or creating a higher priority ticket and notifying the customer with an automated telephone call if the affected circuit(s), the 911 service, and/or the customer's 911 system is completely down; and/or the like.

In the Metro Ring flow example, IAA may include one or more automations that monitor the status of a Metro Ring, the one or more automations including, but not limited to, one or more of calling an external script that gathers data regarding the Metro Ring (including status, customers, devices in the ring, etc.); searching for other alerts and/or issues based on the devices and circuits returned by the script; determining, based on the number of affected customers, the priority of the ticket; create an outage ticket and customer tickets if two or more customers are affected, thereby notifying the affected customers that they are part of an outage; or adding script results, other alert data, circuit layout, and/or any other relevant data to the ticket (so that the outage team can easily communicate with the customers and keep them informed of the outage progress, etc.); and/or the like. This automation saves NOCs several hours of manually determining the outage and notifying customers that there is an issue by grouping all the related alerts together into one event. In a use case example, at the beginning of the year that this patent document was filed, IAA saved NOCs approximately 650 hours per month, and 8 months later, the time savings has increased by almost 300%, with IAA saving NOCs approximately 2550 hours per month.

In the fiber cut flow example, IAA may include one or more automations that address cuts in optical fiber, the one or more automations including, but not limited to, one or more of determining the extent of the fiber cut; verifying that the outage is not due to a maintenance activity; seeking out or finding data regarding any changes to the fiber; creating an outage ticket and customer tickets if two or more customers are affected, thereby notifying the affected customers that they are part of an outage; or adding script results, other alert data, circuit layout, and/or any other relevant data to the ticket (so that the outage team can easily communicate with the customers and keep them informed of the outage progress, etc.); and/or the like. This automation saves NOCs several hours of manually determining the outage and notifying customers that there is an issue by grouping all the related alerts together into one event. In a use case example, at the beginning of the year that this patent document was filed, IAA saved NOCs approximately 650 hours per month, and 8 months later, the time savings has increased by almost 300%, with IAA saving NOCs approximately 2550 hours per month.

Overall, IAA has over 1000 flows or automations running as of the filing of this patent document. These flows or automations perform a range of functions from merely emailing to more complex functions like creating a Network Event and notifying many customers of the issue. In a use case example, at the beginning of the year that this patent document was filed, IAA, as a whole, saved NOCs approximately 21,500 hours per month, and 8 months later, the time savings has increased by almost 70%, with IAA saving NOCs approximately 36,400 hours per month. In some embodiments, IAA may be developed with a plug-and-play approach, allowing many users to be trained on how to build an IAA flow or automation. With over 190 functions at the time of filing of this patent document, this allows each NOC and small or medium-sized enterprise ("SME") to build a flow or automation that is unique to their needs.

Figure 3B:
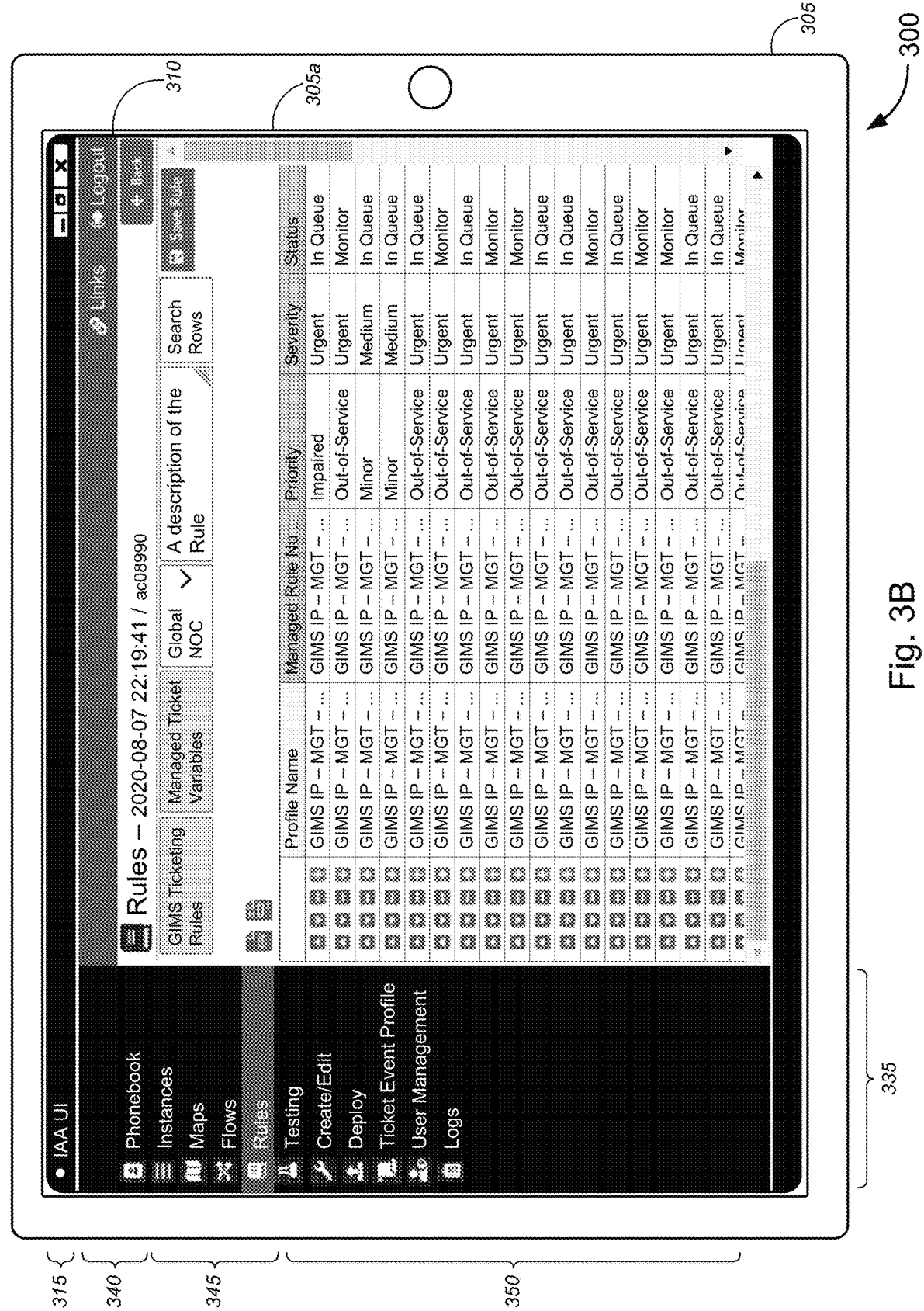

Referring now to the non-limiting example of FIG. 3B, the app or portal 310 may further include, without limitation, a title portion 340 (e.g., indicating the functionality(ies) being offered by the IAA UI, in this case, "Rules," and one or more virtual buttons or options (e.g., for generating links, for logging out, and/or for going back, or the like)), a rule creation/editing portion 345 (including one or more entry fields (e.g., for entering the name of the set of rules (in this case, "GIMS Ticketing Rules" or the like), for entering the type of variables (in this case, "Managed Ticket Variables" or the like), for entering or selecting from a drop-down list the NOC (in this case, "Global NOC" or the like), for entering a description of the rule, for searching rows or rules, etc.), one or more virtual buttons or options (e.g., for saving a rule, for selecting type of output for the table containing the rules and corresponding information (e.g., comma-separated values ("CSV") file or other document file, or the like), etc.)), a display portion 350 for displaying the table containing metadata for the rules (including, but not limited to, profile name, Lan or WAN information (not shown), managed rule number, escalation (not shown), priority, severity, status, type (not shown), subtype (not shown), title (not shown), or subtype detail (not shown), etc.) and in some cases options or buttons (e.g., for moving a rule up or down in order within the table, for expanding or collapsing fields for a particular rule within the table, or the like), and/or the like.

Figure 3C:
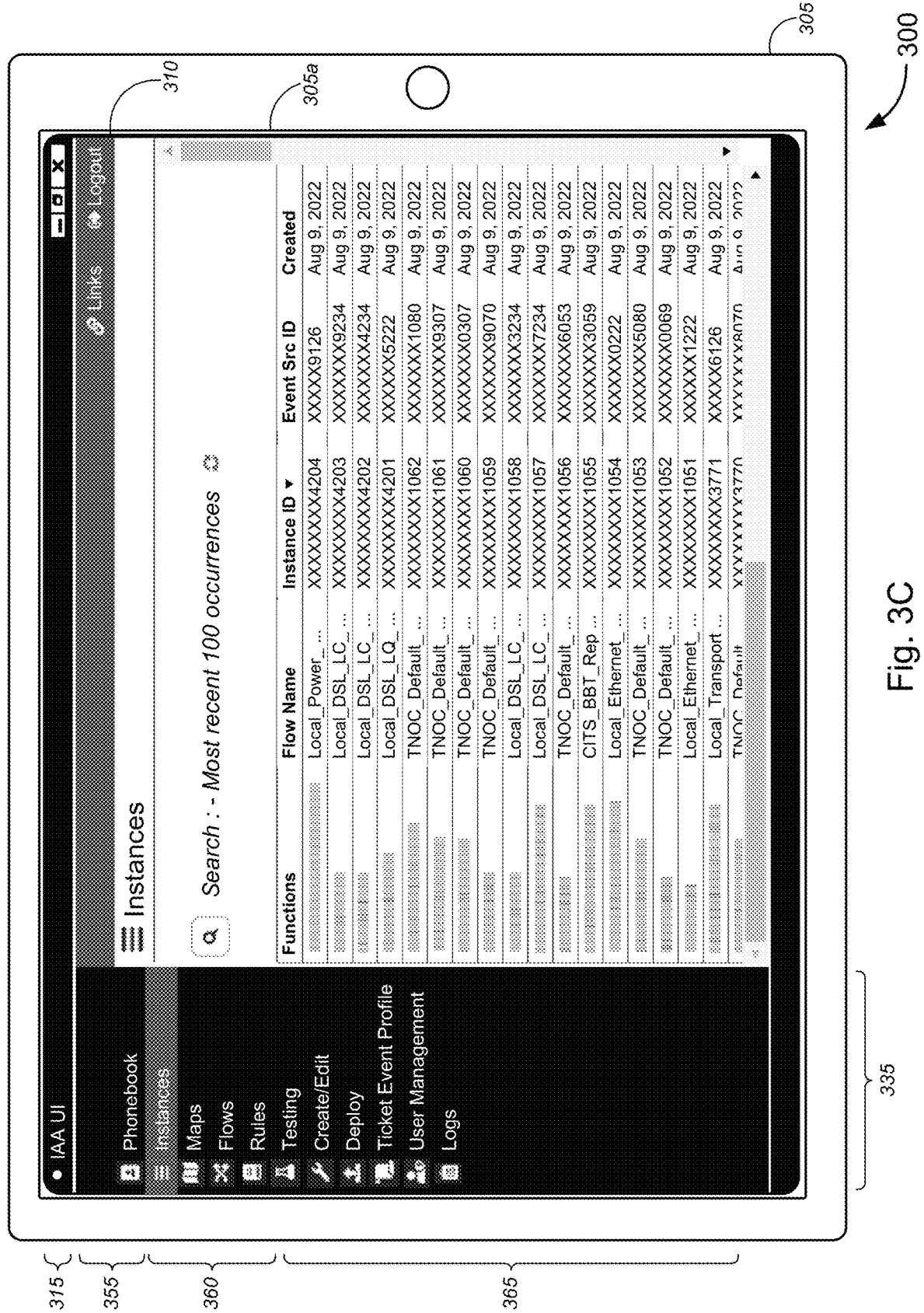

As shown in the non-limiting example of FIG. 3C, the app or portal 310 may further include, without limitation, a title portion 355 (e.g., indicating the functionality(ies) being offered by the IAA UI, in this case, "Instances," and one or more virtual buttons or options (e.g., for generating links and for logging out, or the like)), a search portion 360 (including one or more virtual buttons or options (e.g., for searching flow instances, for refreshing the search results, or the like)), and a display portion 365 for displaying a table that lists flow instances and their metadata (including, but not limited to, a graphical representation of functions used by each flow instance, flow name, instance ID, event source ID, date and/or time created (partially shown), date and/or time updated (not shown), and/or the like), and/or the like.

Figure 3D:
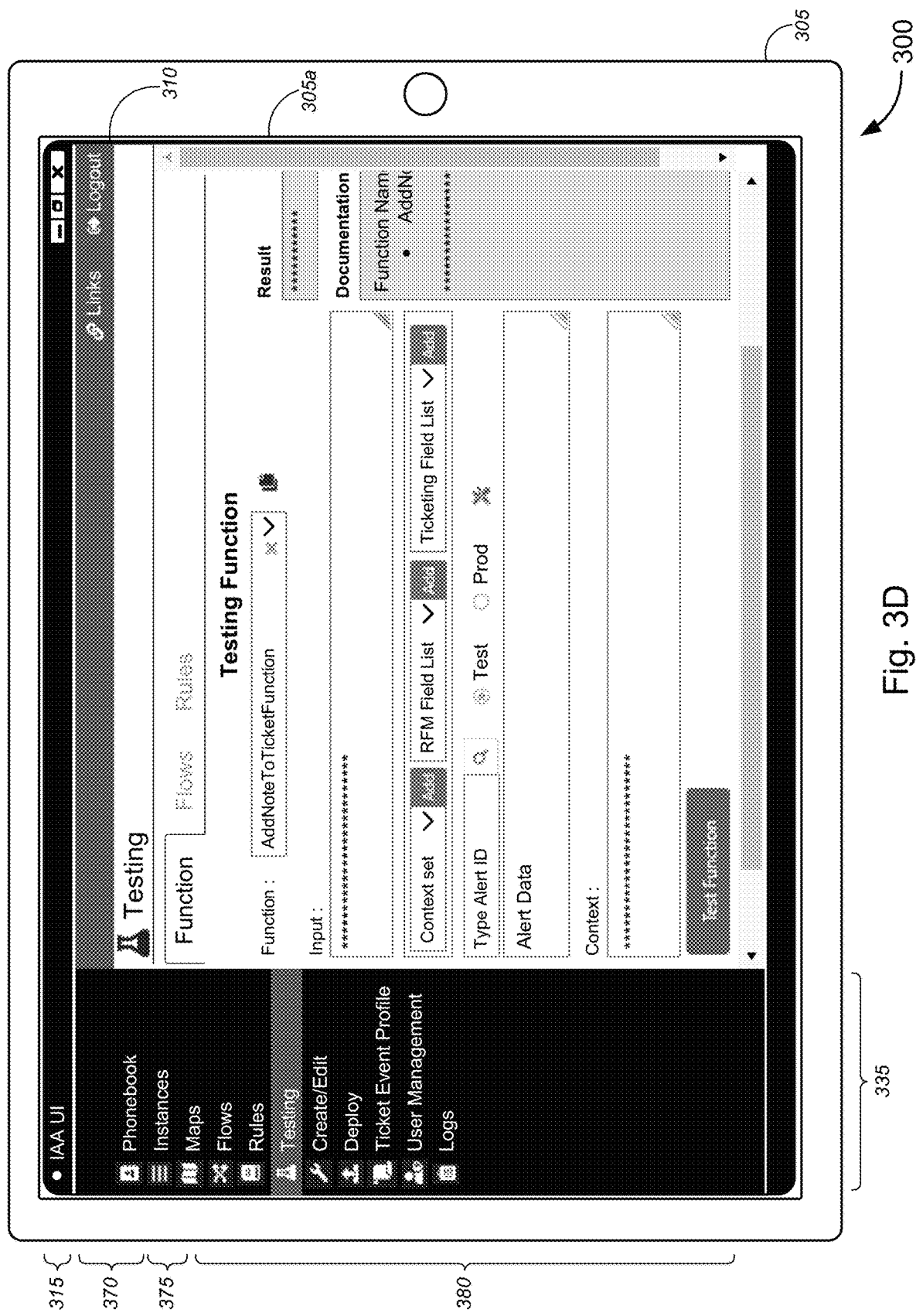

As shown in the non-limiting example of FIG. 3D, the app or portal 310 may further include, without limitation, a title portion 370 (e.g., indicating the functionality(ies) being offered by the IAA UI, in this case, "Testing," and one or more virtual buttons or options (e.g., for generating links and for logging out, or the like)), a tabs portion 375 (including one or more tabs (e.g., for testing a function (which is selected in this case), for testing a flow(s), or for testing a rule(s), or the like)), and a testing form portion 380 (in this case for testing a function; including one or more entry fields (including, but not limited to, fields and corresponding options or virtual buttons (if any) for entering, selecting, or searching for the name of the function for testing, for entering inputs to test the function, for selecting and adding one or more context sets, for entering or searching for an alert ID, for selecting between a test or a product, for accessing settings or tools, for entering alert data, for entering context data, for selecting to test the function, and/or the like), one or more display fields (including a results field for displaying results of the testing, a documentation field for displaying information regarding the function and the testing of the function, etc.)), and/or the like.

Herein, "X" and "*" in FIG. 3 represents redacted information, for the purposes of simplicity of illustration in this patent document, but would be visible to a user during regular use of the IAA UI (unless otherwise indicated).

Figure 4A:
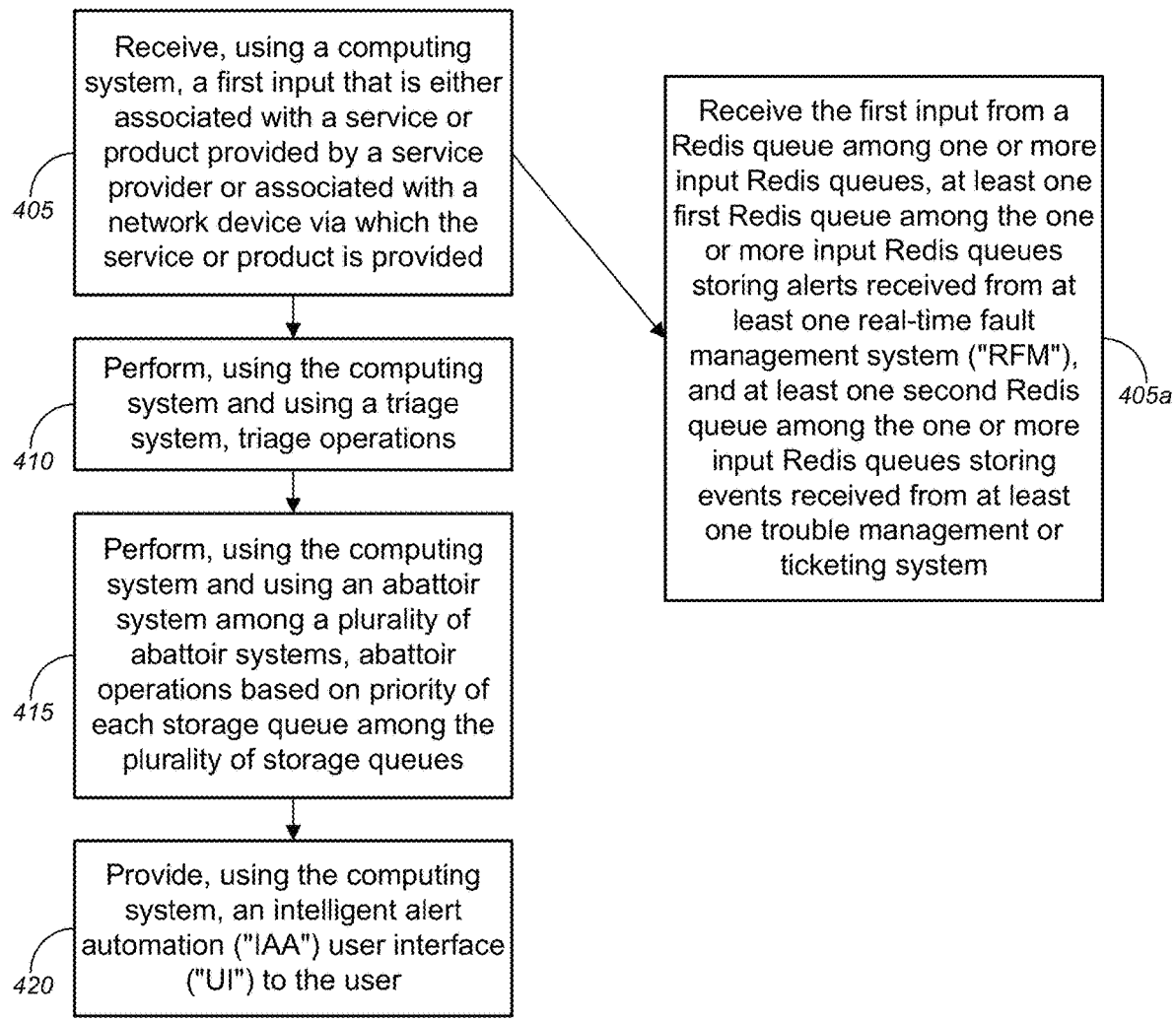
FIGS. 4A-4C are flow diagrams illustrating a method for implementing IAA, in accordance with various embodiments.
Figure 4B:
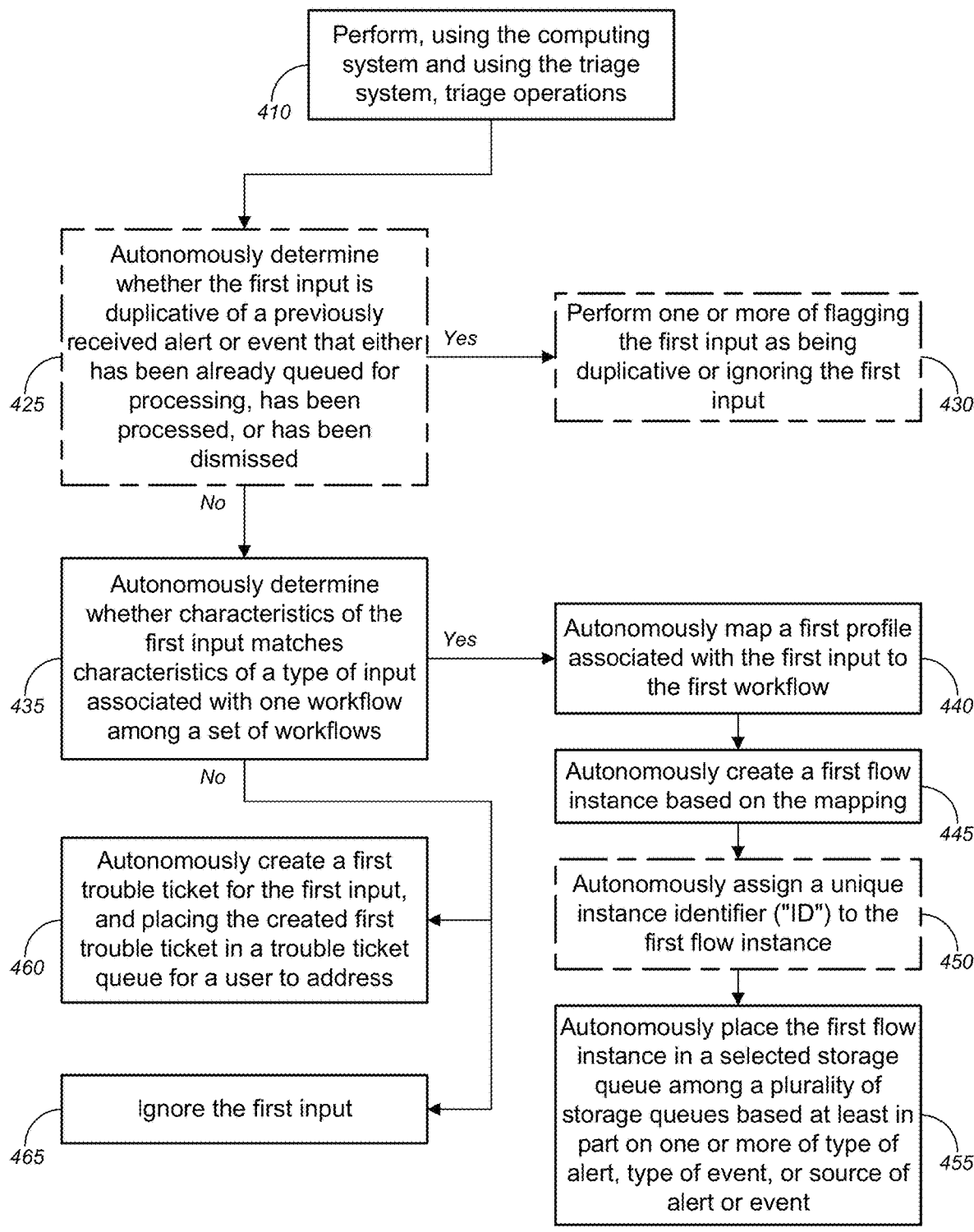
Figure 4C:
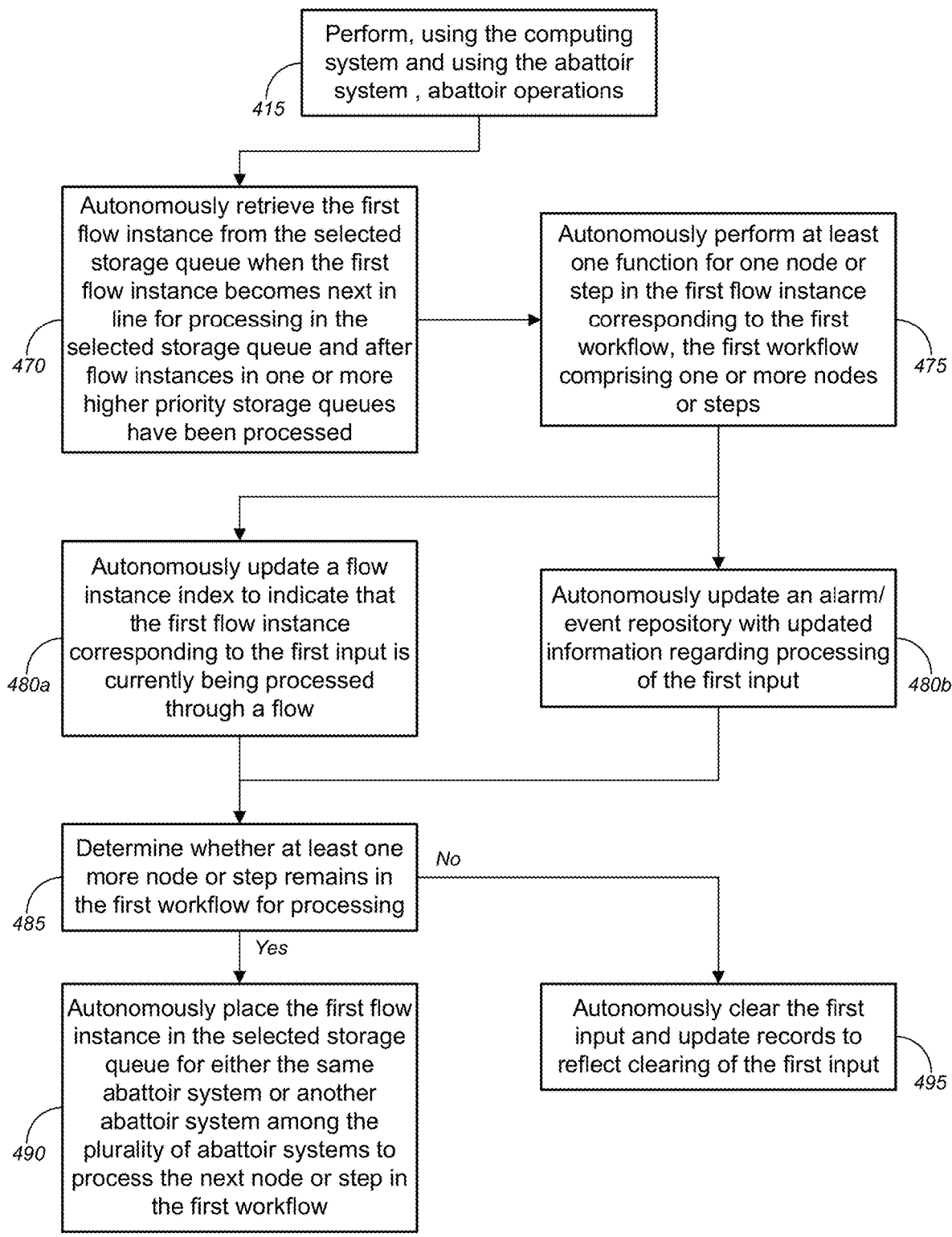

FIGS. 4A-4C (collectively, "FIG. 4") are flow diagrams illustrating a method 400 for implementing IAA, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 310 of FIGS. 1, 2, and 3, respectively (or components thereof), such methods may also be implemented using any suitable hardware (or software) implementation. Similarly, while each of the systems, examples, or embodiments 100, 200, and 310 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 310 of FIGS. 1, 2, and 3 can each also operate according to other modes of operation and/or perform other suitable procedures.

In the non-limiting embodiment of FIG. 4A, method 400, at block 405, may comprise receiving, using a computing system, a first input that is either associated with a service or product provided by a service provider or associated with a network device via which the service or product is provided, the first input including one of a first alert or a first event among a plurality of alerts and/or events, the network device being disposed in a first network among a plurality of networks. In some embodiments, receiving the first input (at block 405) may comprise receiving the first input from a remote dictionary server ("Redis") queue among one or more input Redis queues, at least one first Redis queue among the one or more input Redis queues storing alerts received from at least one real-time fault management system ("RFM"), and at least one second Redis queue among the one or more input Redis queues storing events received from at least one trouble management or ticketing system, or the like.

In some embodiments, the computing system may include, without limitation, at least one of a network management system server, a fault management system, an intelligent alert automation ("IAA") computing system, a network operations center ("NOC") computing system, a server over a network, a cloud computing system, or a distributed computing system, and/or the like.

At block 410, method 400 may comprise performing, using the computing system and using a triage system, triage operations. Method 400 may further comprise performing, using the computing system and using an abattoir system among a plurality of abattoir systems, abattoir operations based on priority of each storage queue among the plurality of storage queues (block 415).

Method 400 may further comprise, at block 420, providing, using the computing system, an intelligent alert automation ("IAA") user interface ("UI") to the user. According to some embodiments, the IAA UI may include, but is not limited to, at least one of: an instances tool configured to enable the user to list and/or search flow instances; a mapping tool configured to enable the user to map workflows and/or visualize mappings of workflows; a flow interface tool configured to enable the user to view and search existing workflows; a rules interface tool configured to enable the user to view, list, create, edit, search, and/or save rules; a testing tool configured to enable the user to test functions, flows, and/or rules; a flow creation and editing tool configured to enable the user to view, create, edit, validate, and/or save workflows; a deployment tool configured to enable the user to deploy code updates and/or deploy nodes in a workflow; or a ticket event profile tool configured to enable the user to view, list, create, edit, search, and/or save ticket events; and/or the like.

With reference to the non-limiting embodiment of FIG. 4B, performing, using the computing system and using the triage system, triage operations (at block 410) may comprise autonomously determining whether the first input is duplicative of a previously received alert or event that either has been already queued for processing, has been processed, or has been dismissed (at optional block 425). If so, method 400 continues onto the process at optional block 430. If not, method 400 continues onto the process at block 435. At optional block 430, method 400 may comprise, based on a determination that the first input is duplicative of a previously received alert or event, performing one or more of flagging the first input as being duplicative or ignoring the first input.

At block 435, method 400 may comprise autonomously determining whether characteristics of the first input matches characteristics of a type of input associated with one workflow among a set of workflows. If so, method 400 continues onto the process at block 440. If not, method 400 continues onto the process at block 460. Based on a determination that characteristics of the first input matches characteristics of a type of input associated with a first workflow among the set of workflows, method 400 may comprise autonomously mapping a first profile associated with the first input to the first workflow (block 440); autonomously creating a first flow instance based on the mapping (block 445); autonomously assigning a unique instance identifier ("ID") to the first flow instance (optional block 450); and autonomously placing the first flow instance in a selected storage queue among a plurality of storage queues based at least in part on one or more of type of alert, type of event, or source of alert or event, and/or the like (block 455). Alternatively, based on a determination that characteristics of the first input does not match characteristics of the type of input associated with any of the set of workflows, method 400 may comprise performing one of autonomously creating a first trouble ticket for the first input, and placing the created first trouble ticket in a trouble ticket queue for a user to address (block 460); or ignoring the first input (block 465); and/or the like. In some instances, autonomously determining whether characteristics of the first input matches characteristics of the type of input associated with one workflow among the set of workflows (at block 435) may comprise autonomously comparing the first profile with profile types for the type of input associated with each of one or more of the set of workflows (not shown).

Referring to the non-limiting embodiment of FIG. 4C, performing, using the computing system and using the abattoir system, abattoir operations (at block 415) may comprise autonomously retrieving the first flow instance from the selected storage queue when the first flow instance becomes next in line for processing in the selected storage queue and after flow instances in one or more higher priority storage queues have been processed (block 470); autonomously performing at least one function for one node or step in the first flow instance corresponding to the first workflow, the first workflow comprising one or more nodes or steps (block 475); and performing at least one of: autonomously updating a flow instance index to indicate that the first flow instance corresponding to the first input is currently being processed through a flow (block 480*a*); or autonomously updating an alarm/event repository with updated information regarding processing of the first input (block 480*b*). Performing, using the computing system and using the abattoir system, abattoir operations (at block 415) may further comprise determining whether at least one more node or step remains in the first workflow for processing (block 485). If so, method 400 continues onto the process at block 490. If not, method 400 continues onto the process at block 495. At block 490, method 400 may comprise, based on a determination that at least one more node or step remains in the first workflow for processing (and, in some cases, that a trouble ticket has not yet been created for the first flow instance), autonomously placing the first flow instance in the selected storage queue for either the same abattoir system or another abattoir system among the plurality of abattoir systems to process the next node or step in the first workflow. Alternatively, at block 495, method 400 may comprise, based on a determination that processing for the first flow instance has been completed (and, in some cases, that a trouble ticket need not be created), autonomously clearing the first input and updating records to reflect clearing of the first input.

In some embodiments, the triage system may be among a plurality of triage systems that is disposed across a first plurality of servers in the plurality of networks. In some cases, the plurality of abattoir systems may be disposed across a second plurality of servers in the plurality of networks. In some instances, the first plurality of servers and the second plurality of servers may be one of the same set of servers, different sets of servers, or overlapping sets of servers. In some cases, the plurality of triage systems may concurrently perform triage operations in parallel, and the plurality of abattoir systems may concurrently perform abattoir operations in parallel.

According to some embodiments, performing the abattoir operations may further include, without limitation, at least one of: autonomously calling a script to gather data; autonomously searching for other alerts or issues based on one or more devices; autonomously searching for other alerts or issues based on one or more circuits returned by a script; autonomously verify whether an alert or event is due to a maintenance activity; autonomously creating a trouble ticket; autonomously determining priority of a trouble ticket based on number of customers affected by an alert or event; autonomously adding one or more of script results, other alert data, circuit layout, circuit details, or other relevant data to a trouble ticket; autonomously sending messages regarding an alert or event and/or a trouble ticket to one or more users; or autonomously sending messages regarding an alert or event to one or more affected customers; and/or the like.

In some cases, the at least one function may include, but is not limited to, one or more of: an XY job function that returns a True value based on a determination that an alert or event occurs X number of times within a Y period, wherein X and Y are settable or resettable values; a timer function that holds a flow instance corresponding to an alert or event for a Z period before processing, wherein Z is a settable or resettable value; a part ordering function that makes a call via an application programming interface ("API") to a part ordering system based on data gathered during a workflow, that returns a True value if the part order is successful, and that returns a False value if an issue arises with the part order; at least one ticketing system function comprising one or more of an add note to ticket function, an assign ticket function, a change ticket title function, a close ticket function, a dispatch ticket function, or a search for ticket function; at least one alert system function comprising one or more of an add note to alert function, a clear alert function, a delete alert function, a create alert function, or an add ticket number function; a network device translation language protocol ("TL1") function that sends one or more TL1 commands to a network device, wherein the one or more TL1 commands comprise at least one of a command for the network device to gather and send data, a command for the network device to send status information, or a command to reset the network device; at least one notification function to call external APIs to send messages, the messages comprising one or more of e-mail messages, pages, communications platform messages to individuals, communications platform group messages, short message service ("SMS") messages, or multimedia messaging service ("MIMS") messages; at least one script function that puts a flow instance on hold while calling one or more external scripts to return with data; or an event outage function that identifies customers affected by an outage, that creates an event ticket for a user to monitor the outage, that sends updates to the user, and that creates all customer trouble tickets to keep customers informed of the outage; and/or the like.

In some instances, the plurality of storage queues may include, without limitation, a plurality of jobs queues that are each stored in one of a plurality of jobs remote dictionary server ("Redis") queues. In some cases, the plurality of jobs queues may include, but is not limited to, at least one of a 911 jobs queue, a Metro Ethernet Network jobs queue, a network monitoring appliance ("NMA") jobs queue, an access gateway ("AG") jobs queue, a global Internet Protocol management system ("GIMS") jobs queue, a next generation 911 ("NG911") jobs queue, a deployable network operations center ("DNOC") jobs queue, an event jobs queue, or a default jobs queue, and/or the like. In some instances, each of the plurality of jobs queues may have a priority relative to other jobs queues that dictates the order that the jobs queues are processed by the plurality of abattoir systems. In some cases, the trouble ticket queue may be stored in one or more ticket Redis queues.

Exemplary System and Hardware Implementation

Figure 5:
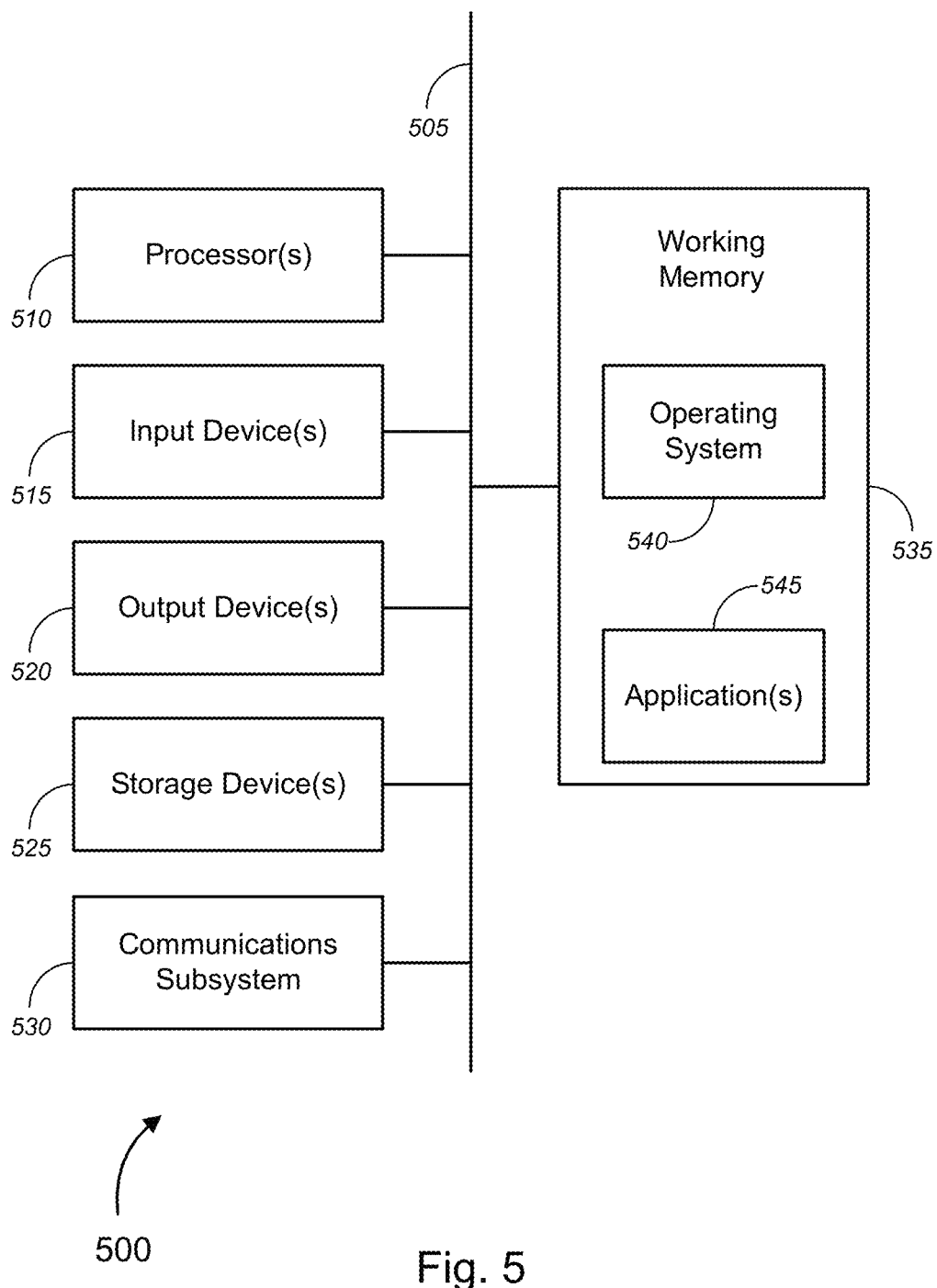
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems or intelligent alert automation ("IAA") system 105, triage systems 145a-145n and 245a-245n, abattoir systems 170a-170n and 270a-270n, user devices 185a-185n, and external systems 190a-190n and 290, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems or IAA system 105, triage systems 145a-145n and 245a-245n, abattoir systems 170a-170n and 270a-270n, user devices 185a-185n, and external systems 190a-190n and 290, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, using a computing system, a first input that is either associated with a service or product provided by a service provider or associated with a network device via which the service or product is provided, the first input comprising one of a first alert or a first event among a plurality of alerts and/or events, the network device being disposed in a first network among a plurality of networks;
    performing, using the computing system and using a triage system, triage operations, by:
    autonomously determining whether characteristics of the first input matches characteristics of a type of input associated with one workflow among a set of workflows;
    based on a determination that characteristics of the first input matches characteristics of a type of input associated with a first workflow among the set of workflows, performing the following:
    autonomously mapping a first profile associated with the first input to the first workflow;
    autonomously creating a first flow instance based on the mapping; and
    autonomously placing the first flow instance in a selected storage queue among a plurality of storage queues based at least in part on one or more of type of alert, type of event, or source of alert or event; and based on a determination that characteristics of the first input does not match characteristics of the type of input associated with any of the set of workflows, performing one of the following:

autonomously creating a first trouble ticket for the first input, and placing the created first trouble ticket in a trouble ticket queue for a user to address; or ignoring the first input; and performing, using the computing system and using an abattoir system among a plurality of abattoir systems, abattoir operations based on priority of each storage queue among the plurality of storage queues, by:

autonomously retrieving the first flow instance from the selected storage queue when the first flow instance becomes next in line for processing in the selected storage queue and after flow instances in one or more higher priority storage queues have been processed;

autonomously performing at least one function for one node or step in the first flow instance corresponding to the first workflow, the first workflow comprising one or more nodes or steps;

based on a determination that a trouble ticket has not yet been created for the first flow instance and that at least one more node or step remains in the first workflow for processing, autonomously placing the first flow instance in the selected storage queue for either the same abattoir system or another abattoir system among the plurality of abattoir systems to process the next node or step in the first workflow; and based on a determination that processing for the first flow instance has been completed and that a trouble ticket need not be created, autonomously clearing the first input and updating records to reflect clearing of the first input.

2. The method of claim 1, wherein the computing system comprises at least one of a network management system server, a fault management system, an intelligent alert automation ("IAA") computing system, a network operations center ("NOC") computing system, a server over a network, a cloud computing system, or a distributed computing system.

3. The method of claim 1, wherein autonomously determining whether characteristics of the first input matches characteristics of the type of input associated with one workflow among the set of workflows comprises autonomously comparing the first profile with profile types for the type of input associated with each of one or more of the set of workflows.

4. The method of claim 1, wherein performing the triage operations further comprises:

autonomously determining whether the first input is duplicative of a previously received alert or event that either has been already queued for processing, has been processed, or has been dismissed;

based on a determination that the first input is duplicative of a previously received alert or event, performing one or more of flagging the first input as being duplicative or ignoring the first input; and based on a determination that the first input is not duplicative of a previously received alert or event and based on the determination that characteristics of the first input matches characteristics of a type of input associated with a first workflow among the set of workflows, further performing the following:

autonomously assigning a unique instance identifier ("ID") to the first flow instance, prior to autonomously placing the first flow instance in the selected storage queue.

5. The method of claim 1, wherein the triage system is among a plurality of triage systems that is disposed across a first plurality of servers in the plurality of networks, wherein the plurality of abattoir systems is disposed across a second plurality of servers in the plurality of networks, wherein the first plurality of servers and the second plurality of servers are one of the same set of servers, different sets of servers, or overlapping sets of servers, wherein the plurality of triage systems concurrently performs triage operations in parallel, and wherein the plurality of abattoir systems concurrently performs abattoir operations in parallel.

6. The method of claim 1, wherein performing the abattoir operations further comprises:

while the first flow instance is being processed by the abattoir system, performing at least one of:

autonomously updating a flow instance index to indicate that the first flow instance corresponding to the first input is currently being processed through a flow; or autonomously updating an alarm/event repository with updated information regarding processing of the first input.

7. The method of claim 1, wherein performing the abattoir operations further comprises at least one of:

autonomously calling a script to gather data;

autonomously searching for other alerts or issues based on one or more devices;

autonomously searching for other alerts or issues based on one or more circuits returned by a script;

autonomously verify whether an alert or event is due to a maintenance activity;

autonomously creating a trouble ticket;

autonomously determining priority of a trouble ticket based on number of customers affected by an alert or event;

autonomously adding one or more of script results, other alert data, circuit layout, circuit details, or other relevant data to a trouble ticket;

autonomously sending messages regarding an alert or event and/or a trouble ticket to one or more users; or autonomously sending messages regarding an alert or event to one or more affected customers.

8. The method of claim 1, wherein the at least one function comprises one or more of:

an XY job function that returns a True value based on a determination that an alert or event occurs X number of times within a Y period, wherein X and Y are settable or resettable values;

a timer function that holds a flow instance corresponding to an alert or event for a Z period before processing, wherein Z is a settable or resettable value;

a part ordering function that makes a call via an application programming interface ("API") to a part ordering system based on data gathered during a workflow, that returns a True value if the part order is successful, and that returns a False value if an issue arises with the part order;

at least one ticketing system function comprising one or more of an add note to ticket function, an assign ticket function, a change ticket title function, a close ticket function, a dispatch ticket function, or a search for ticket function;

at least one alert system function comprising one or more of an add note to alert function, a clear alert function, a delete alert function, a create alert function, or an add ticket number function;

a network device translation language protocol ("TL1") function that sends one or more TL1 commands to a network device, wherein the one or more TL1 commands comprise at least one of a command for the network device to gather and send data, a command for the network device to send status information, or a command to reset the network device;

at least one notification function to call external APIs to send messages, the messages comprising one or more of e-mail messages, pages, communications platform messages to individuals, communications platform group messages, short message service ("SMS") messages, or multimedia messaging service ("MMS") messages;

at least one script function that puts a flow instance on hold while calling one or more external scripts to return with data; or an event outage function that identifies customers affected by an outage, that creates an event ticket for a user to monitor the outage, that sends updates to the user, and that creates all customer trouble tickets to keep customers informed of the outage.

9. The method of claim 1, wherein the plurality of storage queues comprises a plurality of jobs queues that are each stored in one of a plurality of jobs remote dictionary server ("Redis") queues, wherein the plurality of jobs queues comprises at least one of a 911 jobs queue, a Metro Ethernet Network jobs queue, a network monitoring appliance ("NMA") jobs queue, an access gateway ("AG") jobs queue, a global Internet Protocol management system ("GIMS") jobs queue, a next generation 911 ("NG911") jobs queue, a deployable network operations center ("DNOC") jobs queue, an event jobs queue, or a default jobs queue, wherein each of the plurality of jobs queues has a priority relative to other jobs queues that dictates the order that the jobs queues are processed by the plurality of abattoir systems.

10. The method of claim 1, wherein receiving the first input comprises receiving the first input from a Redis queue among one or more input Redis queues, at least one first Redis queue among the one or more input Redis queues storing alerts received from at least one real-time fault management system ("RFM"), and at least one second Redis queue among the one or more input Redis queues storing events received from at least one trouble management or ticketing system.

11. The method of claim 1, wherein the trouble ticket queue is stored in one or more ticket Redis queues.

12. The method of claim 1, further comprising:
providing, using the computing system, an intelligent alert automation ("IAA") user interface ("UI") to the user, the IAA UI comprising at least one of:
an instances tool configured to enable the user to list and/or search flow instances;
a mapping tool configured to enable the user to map workflows and/or visualize mappings of workflows;
a flow interface tool configured to enable the user to view and search existing workflows;
a rules interface tool configured to enable the user to view, list, create, edit, search, and/or save rules;
a testing tool configured to enable the user to test functions, flows, and/or rules;
a flow creation and editing tool configured to enable the user to view, create, edit, validate, and/or save workflows;
a deployment tool configured to enable the user to deploy code updates and/or deploy nodes in a workflow; or
a ticket event profile tool configured to enable the user to view, list, create, edit, search, and/or save ticket events.

13. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive a first input that is either associated with a service or product provided by a service provider or associated with a network device via which the service or product is provided, the first input comprising one of a first alert or a first event among a plurality of alerts and/or events, the network device being disposed in a first network among a plurality of networks;
perform, using a triage system, triage operations, by:
autonomously determining whether characteristics of the first input matches characteristics of a type of input associated with one workflow among a set of workflows;
based on a determination that characteristics of the first input matches characteristics of a type of input associated with a first workflow among the set of workflows, performing the following:
autonomously mapping a first profile associated with the first input to the first workflow;
autonomously creating a first flow instance based on the mapping; and
autonomously placing the first flow instance in a selected storage queue among a plurality of storage queues based at least in part on one or more of type of alert, type of event, or source of alert or event; and
based on a determination that characteristics of the first input does not match characteristics of the type of input associated with any of the set of workflows, performing one of the following:
autonomously creating a first trouble ticket for the first input, and placing the created first trouble ticket in a trouble ticket queue for a user to address; or
ignoring the first input; and
perform, using an abattoir system among a plurality of abattoir systems, abattoir operations based on priority of each storage queue among the plurality of storage queues, by:
autonomously retrieving the first flow instance from the selected storage queue when the first flow instance becomes next in line for processing in the selected storage queue and after flow instances in one or more higher priority storage queues have been processed;
autonomously performing at least one function for one node or step in the first flow instance corresponding to the first workflow, the first workflow comprising one or more nodes or steps;
based on a determination that a trouble ticket has not yet been created for the first flow instance and that at least one more node or step remains in the first workflow for processing, autonomously placing the first flow instance in the selected storage queue for either the same abattoir system or another abattoir system among the plurality of abattoir systems to process the next node or step in the first workflow; and based on a determination that processing for the first flow instance has been completed and that a trouble ticket need not be created, autonomously clearing the first input and updating records to reflect clearing of the first input.

14. The system of claim 13, wherein the computing system comprises at least one of a network management system server, a fault management system, an intelligent alert automation ("IAA") computing system, a network operations center ("NOC") computing system, a server over a network, a cloud computing system, or a distributed computing system.

15. The system of claim 13, wherein the triage system is among a plurality of triage systems that is disposed across a first plurality of servers in the plurality of networks, wherein the plurality of abattoir systems is disposed across a second plurality of servers in the plurality of networks, wherein the first plurality of servers and the second plurality of servers are one of the same set of servers, different sets of servers, or overlapping sets of servers, wherein the plurality of triage systems concurrently performs triage operations in parallel, and wherein the plurality of abattoir systems concurrently performs abattoir operations in parallel.

16. The system of claim 13, wherein receiving the first input comprises receiving the first input from a remote dictionary server ("Redis") queue among one or more input Redis queues, at least one first Redis queue among the one or more input Redis queues storing alerts received from at least one real-time fault management system ("RFM"), and at least one second Redis queue among the one or more input Redis queues storing events received from at least one trouble management or ticketing system.

17. The system of claim 13, wherein the first set of instructions, when executed by the at least one first processor, further causes the computing system to:

provide an intelligent alert automation ("IAA") user interface ("UI") to the user, the IAA UI comprising at least one of:

an instances tool configured to enable the user to list and/or search flow instances;

a mapping tool configured to enable the user to map workflows and/or visualize mappings of workflows;

a flow interface tool configured to enable the user to view and search existing workflows;

a rules interface tool configured to enable the user to view, list, create, edit, search, and/or save rules;

a testing tool configured to enable the user to test functions, flows, and/or rules;

a flow creation and editing tool configured to enable the user to view, create, edit, validate, and/or save workflows;

a deployment tool configured to enable the user to deploy code updates and/or deploy nodes in a workflow; or a ticket event profile tool configured to enable the user to view, list, create, edit, search, and/or save ticket events.

* * * * *